(12) United States Patent
Wang et al.

(10) Patent No.: US 9,942,927 B2
(45) Date of Patent: Apr. 10, 2018

(54) METHOD AND APPARATUS FOR ACCELERATED LINK SETUP

(71) Applicant: InterDigital Patent Holdings, Inc., Wilmington, DE (US)

(72) Inventors: Lei Wang, San Diego, CA (US); Yousif Targali, Sammamish, WA (US); Sudheer A. Grandhi, Pleasanton, CA (US); Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/651,744

(22) Filed: Jul. 17, 2017

(65) Prior Publication Data
US 2017/0318614 A1   Nov. 2, 2017

Related U.S. Application Data

(63) Continuation of application No. 15/362,305, filed on Nov. 28, 2016, now Pat. No. 9,713,181, which is a
(Continued)

(51) Int. Cl.
*H04W 76/02* (2009.01)
*H04W 12/06* (2009.01)
(Continued)

(52) U.S. Cl.
CPC ........... *H04W 76/021* (2013.01); *H04L 12/06* (2013.01); *H04W 12/06* (2013.01); *H04W 48/08* (2013.01);
(Continued)

(58) Field of Classification Search
CPC ... H04W 76/021; H04W 12/06; H04W 88/08; H04W 48/08; H04W 76/02; H04W 84/12;
(Continued)

(56) References Cited

U.S. PATENT DOCUMENTS 7,624,271 B2   11/2009   Sood et al.
7,640,004 B2   12/2009   Muratsu
(Continued)

FOREIGN PATENT DOCUMENTS

| JP | 2007-013649 | 1/2007 |
| WO | 06/130278 | 12/2006 |
| WO | 11/109052 | 9/2011 |

OTHER PUBLICATIONS

Aboul-Magd, "TGac Jul. 2011 Agenda," IEEE 802.11-11/0922r4 (Jul. 2011).
(Continued)

*Primary Examiner* — Brian O'Connor
(74) *Attorney, Agent, or Firm* — Volpe and Koenig, P.C.

(57) ABSTRACT

A method for performing active scanning by a non-AP STA may comprise transmitting, to a group of APs, one or more probe request frames and receiving in response, configuration chance count (CCC) values from first and second APs of the group of APs. The CCC values may be integer values that represent configuration instances of the respective APs. The CCC values may be stored in a memory of the non-AP STA. A determination may be made, based on the information stored in the memory, as to which AP is preferred. An association procedure may be performed with the preferred AP. Other disclosed methods employ passive scanning.

20 Claims, 21 Drawing Sheets

Related U.S. Application Data continuation of application No. 14/942,127, filed on Nov. 16, 2015, now Pat. No. 9,510,375, which is a continuation of application No. 13/738,589, filed on Jan. 10, 2013, now Pat. No. 9,204,473.

(60) Provisional application No. 61/585,420, filed on Jan. 11, 2012, provisional application No. 61/719,663, filed on Oct. 29, 2012.

(51) Int. Cl.
| | |
|---|---|
| *H04W 48/08* | (2009.01) |
| *H04W 88/08* | (2009.01) |
| *H04L 12/06* | (2006.01) |
| *H04L 29/06* | (2006.01) |
| *H04L 9/08* | (2006.01) |
| *H04W 12/04* | (2009.01) |
| *H04W 84/12* | (2009.01) |

(52) U.S. Cl.
CPC ........... *H04W 88/08* (2013.01); *H04L 9/0844* (2013.01); *H04L 63/0428* (2013.01); *H04W 12/04* (2013.01); *H04W 76/02* (2013.01); *H04W 84/12* (2013.01)

(58) Field of Classification Search
CPC ...... H04W 12/04; H04L 12/06; H04L 9/0844; H04L 63/0428
See application file for complete search history.

(56) References Cited

U.S. PATENT DOCUMENTS

| | | |
|---|---|---|
| 7,890,745 B2 | 2/2011 | Qi et al. |
| 7,930,729 B2 | 4/2011 | Sim et al. |
| 7,987,499 B2 | 7/2011 | Ptasinski et al. |
| 8,054,798 B2 | 11/2011 | Jeong et al. |
| 8,175,058 B2 | 5/2012 | Oba et al. |
| 8,189,608 B2 | 5/2012 | Duo et al. |
| 8,208,900 B2 | 6/2012 | Adler et al. |
| 8,254,353 B2 | 8/2012 | Soneda |
| 8,312,278 B2 | 11/2012 | Tie et al. |
| 8,463,175 B2 | 6/2013 | Bajko |
| 8,467,359 B2 | 6/2013 | McCann et al. |
| 8,467,784 B2 | 6/2013 | Balasubramanian et al. |
| 8,520,583 B2 | 8/2013 | Kasslin et al. |
| 8,560,848 B2 | 10/2013 | Liu et al. |
| 8,635,667 B2 | 1/2014 | Ishibashi et al. |
| 8,665,842 B2 | 3/2014 | McCann et al. |
| 8,695,063 B2 | 4/2014 | Kholaif et al. |
| 8,738,913 B2 | 7/2014 | Hahn et al. |
| 8,811,259 B2 | 8/2014 | Oh |
| 8,812,833 B2 | 8/2014 | Liu et al. |
| 8,873,494 B2 | 10/2014 | Cherian et al. |
| 8,879,471 B2 | 11/2014 | Kneckt et al. |
| 8,879,992 B2 | 11/2014 | Kneckt et al. |
| 8,897,282 B2 | 11/2014 | Adachi et al. |
| 8,923,257 B2 | 12/2014 | Montemurro et al. |
| 8,942,221 B2 * | 1/2015 | McCann ............... H04W 48/12 370/349 |
| 8,958,335 B2 | 2/2015 | Yang et al. |
| 9,008,062 B2 | 4/2015 | Sun et al. |
| 9,191,977 B2 | 11/2015 | Cherian et al. |
| 9,232,548 B2 | 1/2016 | Wang et al. |
| 9,271,226 B2 | 2/2016 | Montemurro et al. |
| 9,271,308 B2 | 2/2016 | Adachi et al. |
| 9,271,317 B2 | 2/2016 | Cherian et al. |
| 9,307,533 B2 | 4/2016 | Adachi et al. |
| 9,338,732 B2 | 5/2016 | Cherian et al. |
| 9,445,438 B2 | 9/2016 | Cherian et al. |
| 2003/0022251 A1 | 1/2003 | Fuchs et al. |
| 2007/0258384 A1 | 11/2007 | Sammour et al. |
| 2008/0109885 A1 | 5/2008 | Sim et al. |
| 2008/0298333 A1 | 12/2008 | Seok |
| 2009/0028101 A1 | 1/2009 | Kakumaru |
| 2009/0055898 A1 | 2/2009 | Kaippallimalil |
| 2010/0275249 A1 | 10/2010 | McCann et al. |
| 2011/0013606 A1 | 1/2011 | Seok |
| 2011/0047592 A1 | 2/2011 | Feder et al. |
| 2011/0083168 A1 | 4/2011 | Dutta et al. |
| 2011/0128916 A1 | 6/2011 | Kwon et al. |
| 2011/0158127 A1 | 6/2011 | Duo et al. |
| 2013/0121325 A1* | 5/2013 | McCann ............... H04W 48/12 370/338 |
| 2016/0248564 A1 | 8/2016 | Qi et al. |

OTHER PUBLICATIONS

Bajko, "3G<_> WLAN Handover," 11-11-0122-00-00ai-3g-wlan-handover (Jan. 2011).
Bajko, "IP address configuration during association," IEEE 802.11-11/1108r1 (Aug. 2011).
Barber et al., "GAS Query Optimization in 11ai," IEEE 802.11-11/1499-00-00ai (Nov. 2011).
Barber et al., "GAS Version Control in 11ai," IEEE 802.11-11/1498-01-00ai (Nov. 2011).
Barber et al., "Normative text for GAS configuration sequence number," IEEE P802.11 Wireless LANs, IEEE 802.11-12/1046r3 (Sep. 2012).
Cherian et al., "Fast Authentication in TGai," IEEE 802.11-11/1160r2 (Sep. 2011).
Cherian et al., "Fast Authentication in TGai," IEEE 802.11-11/1160r4 (Nov. 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802. 11u-2011 (Feb. 25, 2011).
Emmelmann, "Achievable gains in AP Discovery," IEEE 802.11-10/0922r2 (Jul. 2010).
Emmelmann, "TGai Key Technical Ideas," IEEE 802.11-11/1237r0 (Sep. 2011).
Emmelmann, "TGai Key Technical Ideas," IEEE 802.11-11/1237r1 (Sep. 2011).
Emmelmann, "TGai Requirements Document," IEEE P802.11 Wireless LANs, IEEE 802.11-11/0745r5 (May 2011).
Fang et al., "Using Upper Layer Message IE in TGai," IEEE 802.11-11/01047r5 (Nov. 2011).
Fang et al., "Using Upper Layer Message IE in TGai," IEEE 802.11-11/01047r6 (Nov. 2011).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Kim et al., "Enhanced scanning procedure for FILS," IEEE 802. 11-12/1034r4 (Sep. 2012).
Lee et al., "TGai FILS Proposal," IEEE 802.11-11/1000r1 (Jul. 2011).
Mano et al., "IEEE 802.11 for High Speed Mobility," IEEE 802. 11-09/1000r6 (Jan. 19, 2010).
Morioka et al., "Protocol Comparison," IEEE 802.11-10/0988r2, 11-10-0988-02-0fia-protocol-comparison.xlsx (Sep. 2010).
Morioka et al., "Protocol Comparison," IEEE 802.11-yy/xxxxr0, 11-10-0988-02-0fia-protocol-comparison (Sep. 2010).
Morioka et al., "TGai Upper Layer Setup Proposal," IEEE 802.11-11/0977r2 (Sep. 2011).
Morioka et al., "TGai Upper Layer Setup Proposal," IEEE 802.11-11/0977r6 (Nov. 2011).
Moskowitz et al., "Link Setup Flow," IEEE 802.11-11/1066r2 (Jul. 2011).

(56) References Cited

OTHER PUBLICATIONS

Qi et al., "Some Concerns about FIA," IEEE 802.11-10/0853r1 (Jul. 2010).

Siep, "Use Case Reference List for TGai," IEEE P802.11 Wireless LANs, IEEE 802.11-11/0238r18, (Apr. 2011).

Third Generation Partnership Project, "Technical Specification Group Service and System Aspects; 3G Security; Wireless Local Area Network (WLAN) interworking security (Release 6)," 3GPP TS 33.234 V6.9.0 (Mar. 2007).

Third Generation Partnership Project, "Technical Specification Group Service and System Aspects; 3G Security; Wireless Local Area Network (WLAN) interworking security (Release 7)," 3GPP TS 33.234 V7.5.0 (Jun. 2007).

Third Generation Partnership Project, "Technical Specification Group Service and System Aspects; 3G Security; Wireless Local Area Network (WLAN) interworking security (Release 8)," 3GPP TS 33.234 V8.1.0 (Mar. 2008).

Third Generation Partnership Project, "Technical Specification Group Service and System Aspects; 3G Security; Wireless Local Area Network (WLAN) interworking security (Release 9)," 3GPP TS 33.234 V9.2.0 (Jun. 2010).

Third Generation Partnership Project, "Technical Specification Group Services and System Aspects; 3G Security; Wireless Local Area Network (WLAN) interworking security (Release 10)," 3GPP TS 33.234 V10.1.0 (Sep. 2011).

Third Generation Partnership Project, "Technical Specification Group Services and System Aspects; 3G Security; Wireless Local Area Network (WLAN) interworking security (Release 10)," 3GPP TS 33.234 V10.2.0 (Mar. 2012).

Third Generation Partnership Project, "Technical Specification Group Services and System Aspects; 3G Security; Wireless Local Area Network (WLAN) interworking security (Release 11)," 3GPP TS 33.234 V11.2.0 (Dec. 2011).

Third Generation Partnership Project, "Technical Specification Group Services and System Aspects; 3G Security; Wireless Local Area Network (WLAN) interworking security (Release 11)," 3GPP TS 33.234 V11.4.0 (Jun. 2012).

Torab et al., "Issues with join and service discovery," IEEE 802.11-11/0853r0 (Jun. 2011).

Wang, "Discussions about 802.11ai FILS Discovery (FD) Frame Content Design," IEEE 11-12-1030-00-00ai (Sep. 2012).

* cited by examiner

FIG. 4

| 410 | 420 | 430 | 440 | 450 | 460 | 470 | 480 |
|---|---|---|---|---|---|---|---|
| OPTIMIZED/ MINIMIZED HEADER | PRIMARY BEACON RELATED INFO | OPTIMIZIED/ MINIMIZED SUBSET OF PRIMARY BEACON CONTENT | AP DISCOVERY INFO (AS NEEDED) | NETWORK DISCOVERY INFO (AS NEEDED) | SECURITY RELATED INFO (AS NEEDED) | HIGHER LAYER PROTOCOL INFO (AS NEEDED) | OPTIONAL ELEMENTS |

| 510 | 520 | 530 | 540 | 550 | 560 | 570 | 580 |
|---|---|---|---|---|---|---|---|
| HEADER | PRIMARY BEACON CONTENT | SHORT BEACON RELATED INFO (IF NEEDED) | AP DISCOVERY INFO (AS NEEDED) | NETWORK DISCOVERY INFO (AS NEEDED) | SECURITY RELATED INFO (AS NEEDED) | HIGHER LAYER PROTOCOL INFO (AS NEEDED) | OPTIONAL ELEMENTS |

| 610 | 620 | 630 | 640 | 650 | 660 | 670 |
|---|---|---|---|---|---|---|
| CATEGORY (e.g., PUBLIC) | ACTION (e.g., FILS) | AP DISCOVERY INFO (AS NEEDED) | NETWORK DISCOVERY INFO (AS NEEDED) | SECURITY RELATED INFO (AS NEEDED) | HIGHER LAYER PROTOCOL INFO (AS NEEDED) | OPTIONAL ELEMENTS |

600

METHOD AND APPARATUS FOR ACCELERATED LINK SETUP

CROSS REFERENCE TO RELATED APPLICATIONS

This application is a continuation of U.S. patent application Ser. No. 15/362,305 filed on Nov. 28, 2016, which is a continuation of U.S. patent application Ser. No. 14/942,127 filed on Nov. 16, 2015, which issued on Nov. 29, 2016 as U.S. Pat. No. 9,510,375, which claims the benefit of U.S. patent application Ser. No. 13/738,589 filed on Jan. 10, 2013, which issued on Dec. 1, 2015 as U.S. Pat. No. 9,204,473, which claims the benefit of U.S. Provisional Application Ser. No. 61/585,420 filed on Jan. 11, 2012 and U.S. Provisional Application Ser. No. 61/719,663 filed on Oct. 29, 2012, the contents of which are hereby incorporated by reference.

BACKGROUND

A link setup procedure may be configured in an Institute of Electrical and Electronics Engineers (IEEE) 802.11 communications system to include a number of phases. An example link setup process may include an access point (AP) discovery phase, a network discovery phase, an additional time sync function (TSF) phase, an authentication and association phase, and a higher layer internet protocol (IP) setup phase. Such a link setup procedure may take up to a few seconds or more to complete.

SUMMARY

A method and apparatus may be configured to perform accelerated link setup. A method may include a station (STA) acquiring information about an AP of an IEEE 802.11 network in advance through a previously connected IEEE 802.11 interface and/or an interface other than the IEEE 802.11 network. The STA may use the acquired information during a link setup procedure between the STA and the AP. The information may include a suggestion for a specific procedure to complete the link setup procedure between the STA and the AP.

A method and apparatus may be used to pre-establish a security association between a STA and a network to enable and optimize discovery of another network. For example, a fast-EAP may be encapsulated into an 802.11 frame, such as, for example, an authentication frame or an association frame. The authentication procedure performed on the new network may be non-EAP based.

An apparatus may transmit a request for network discovery information from a network entity and receive network discovery information in response. The network discovery information may be received over a cellular network, for example, a 3GPP network. The network discovery information may be received via a Layer 2 protocol.

An apparatus may transmit a request to obtain an IP address configuration from a network. For example, the apparatus may request and receive an IP address configuration during an EAP authentication process or during a non-EAP authentication process. The IP address configuration may be received over a cellular network, for example, a 3GPP network.

A method for performing active scanning by a non-AP STA may comprise transmitting, to a group of APs, one or more probe request frames and receiving in response, configuration chance count (CCC) values from first and second APs of the group of APs. The CCC values may be integer values that represent configuration instances of the respective APs. The CCC values may be stored in a memory of the non-AP STA. A determination may be made, based on the information stored in the memory, as to which AP is preferred. An association procedure may be performed with the preferred AP. Other disclosed methods employ passive scanning.

BRIEF DESCRIPTION OF THE DRAWINGS

A more detailed understanding may be had from the following description, given by way of example in conjunction with the accompanying drawings wherein:

FIG. 4 is a diagram of an example short beacon frame supporting accelerated link setup (ALS);

FIG. 5 is a diagram of an example modification to a primary beacon frame supporting ALS;

FIG. 6 is a diagram of an example fast initial link setup (FILS) management action frame;

DETAILED DESCRIPTION

Figure 1A:
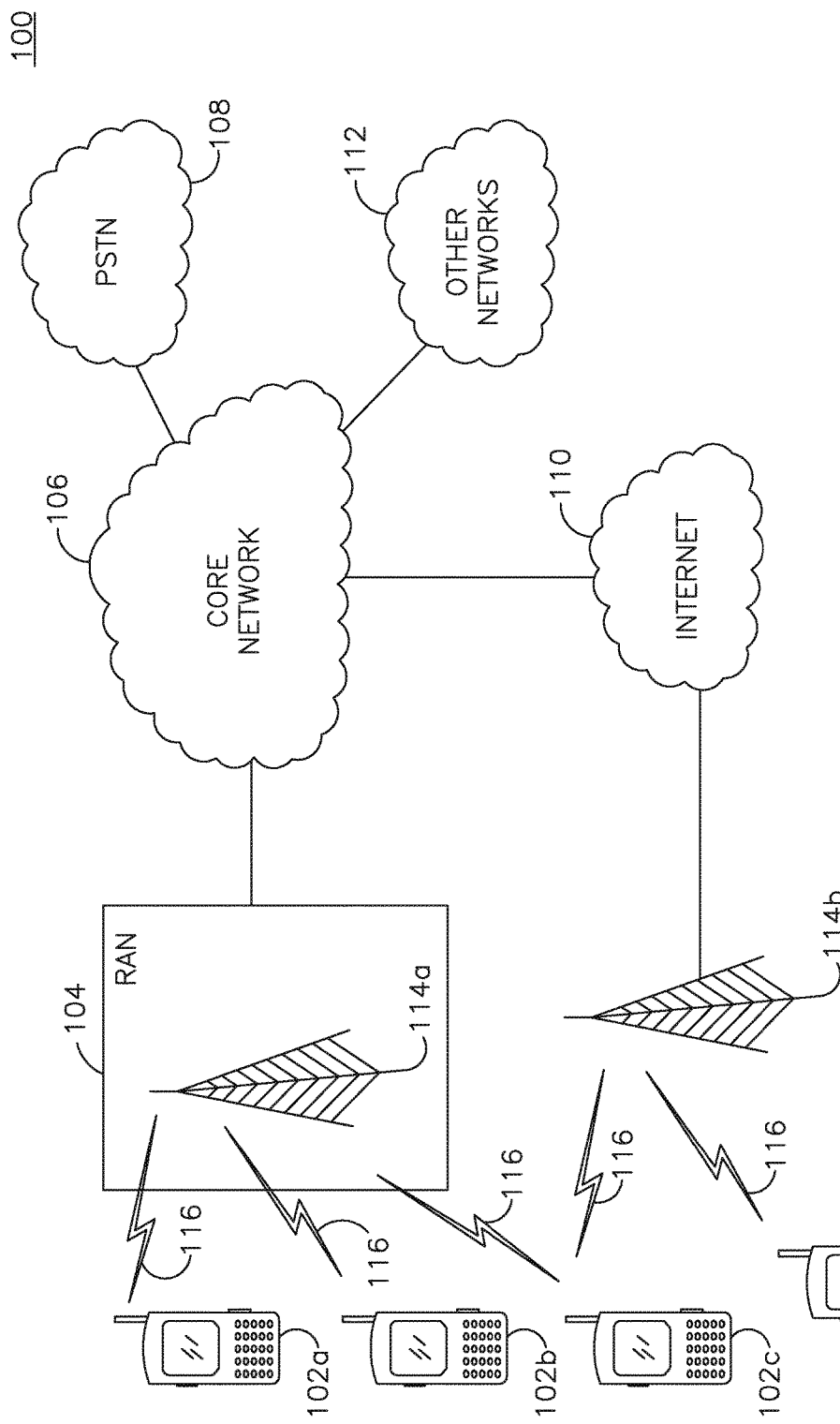
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a station (STA) in an IEEE 802.11 network, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology. A WTRU may be referred to as a station (STA) or a non-access point (non-AP) STA.

Figure 1B:
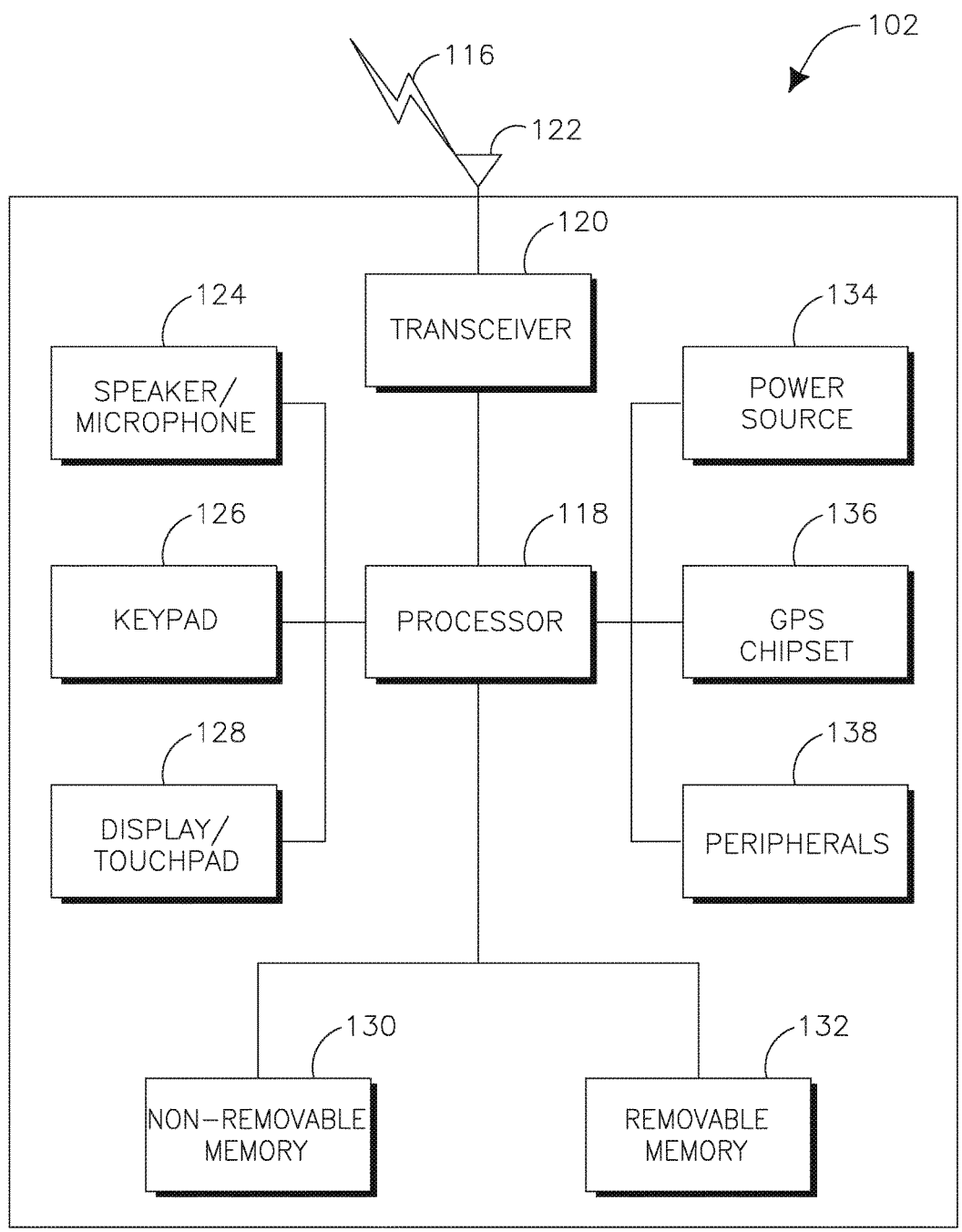
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
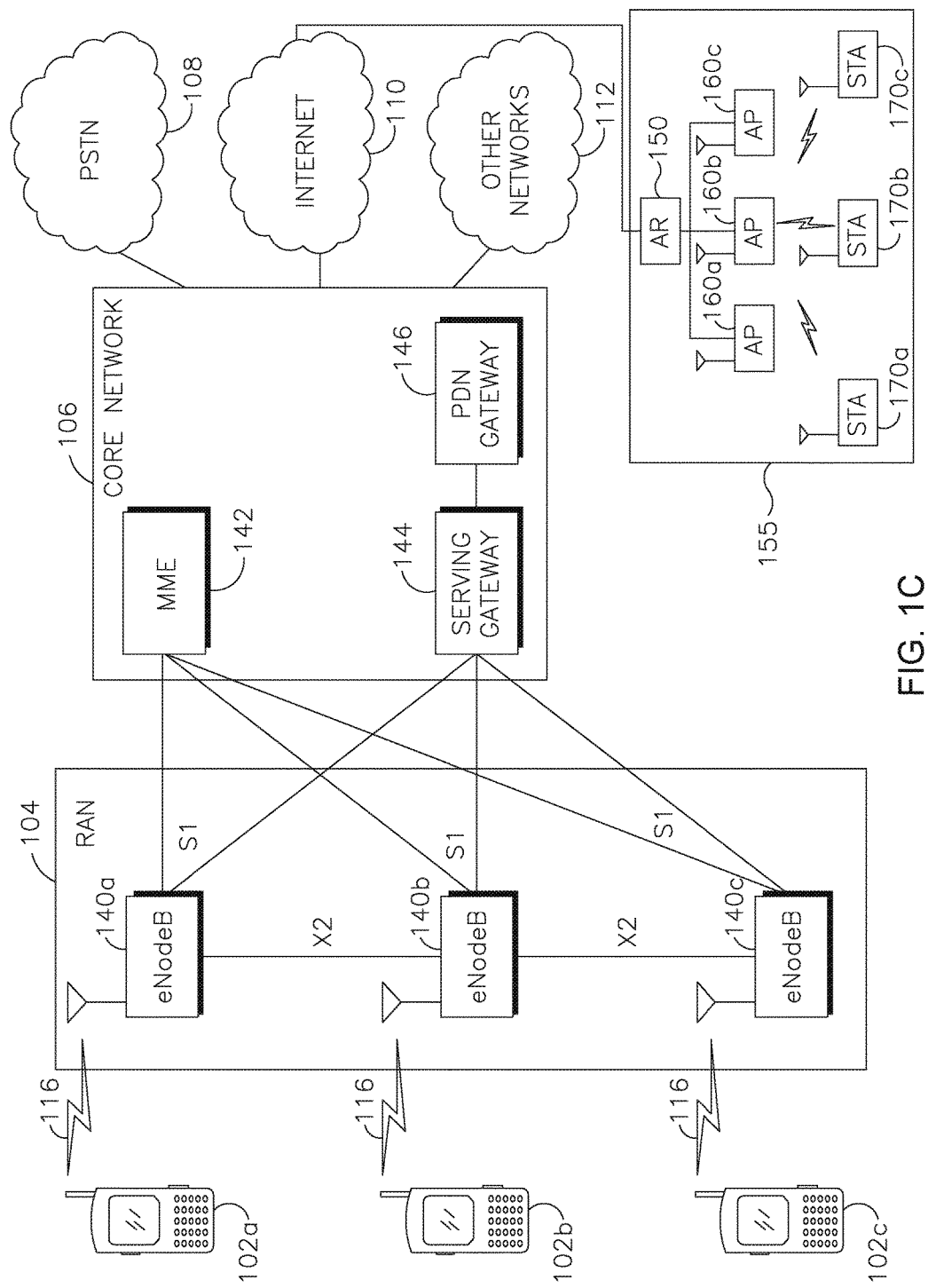
FIG. 1C is a system diagram of an example radio access network and an example core network that may be used within the communications system illustrated in FIG. 1A.

FIG. 1C is an example system diagram of the RAN 104 and the core network 106. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2A:
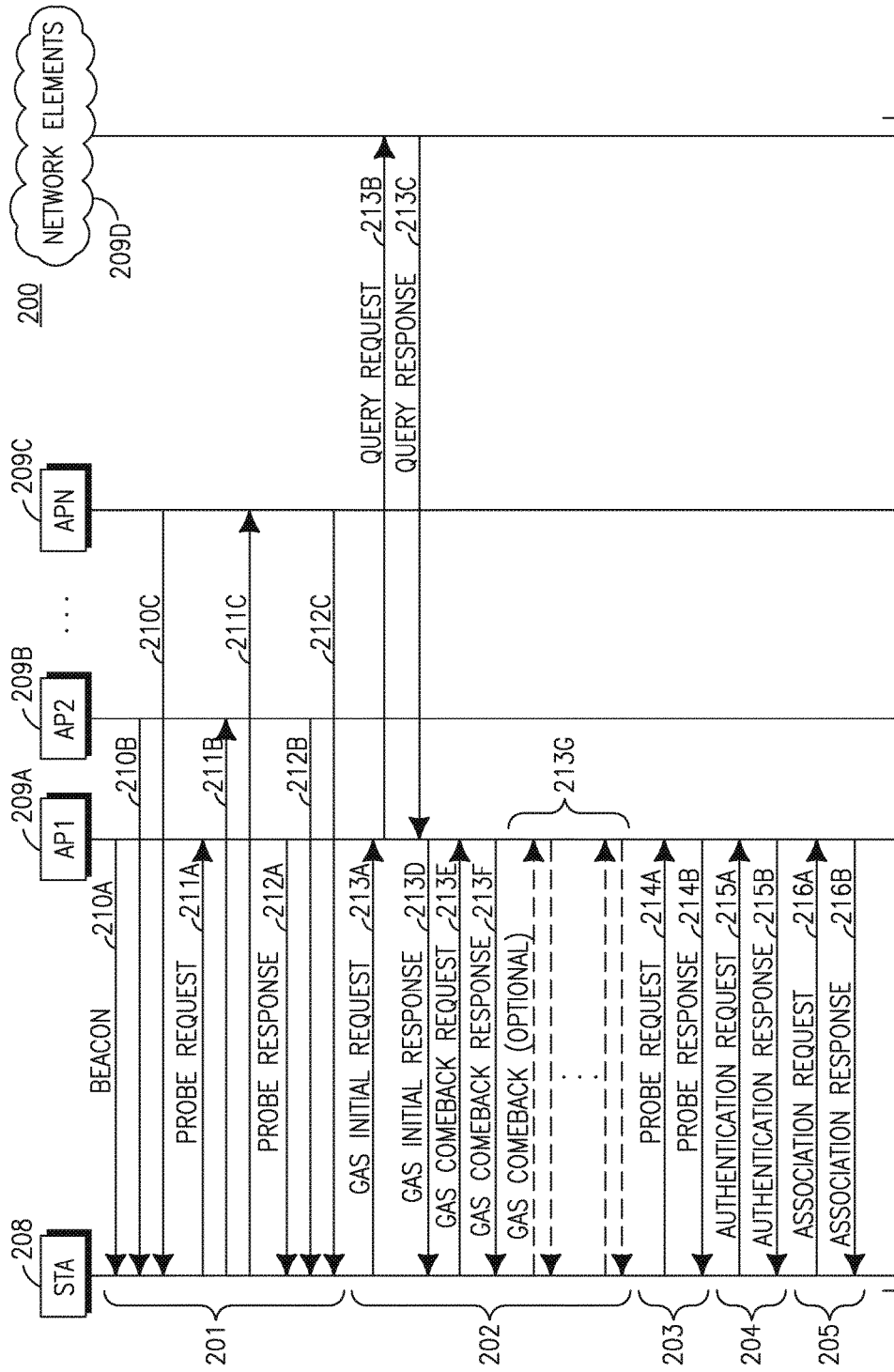
FIG. 2A is a diagram of an example IEEE 802.11 setup procedure.
Figure 2B:
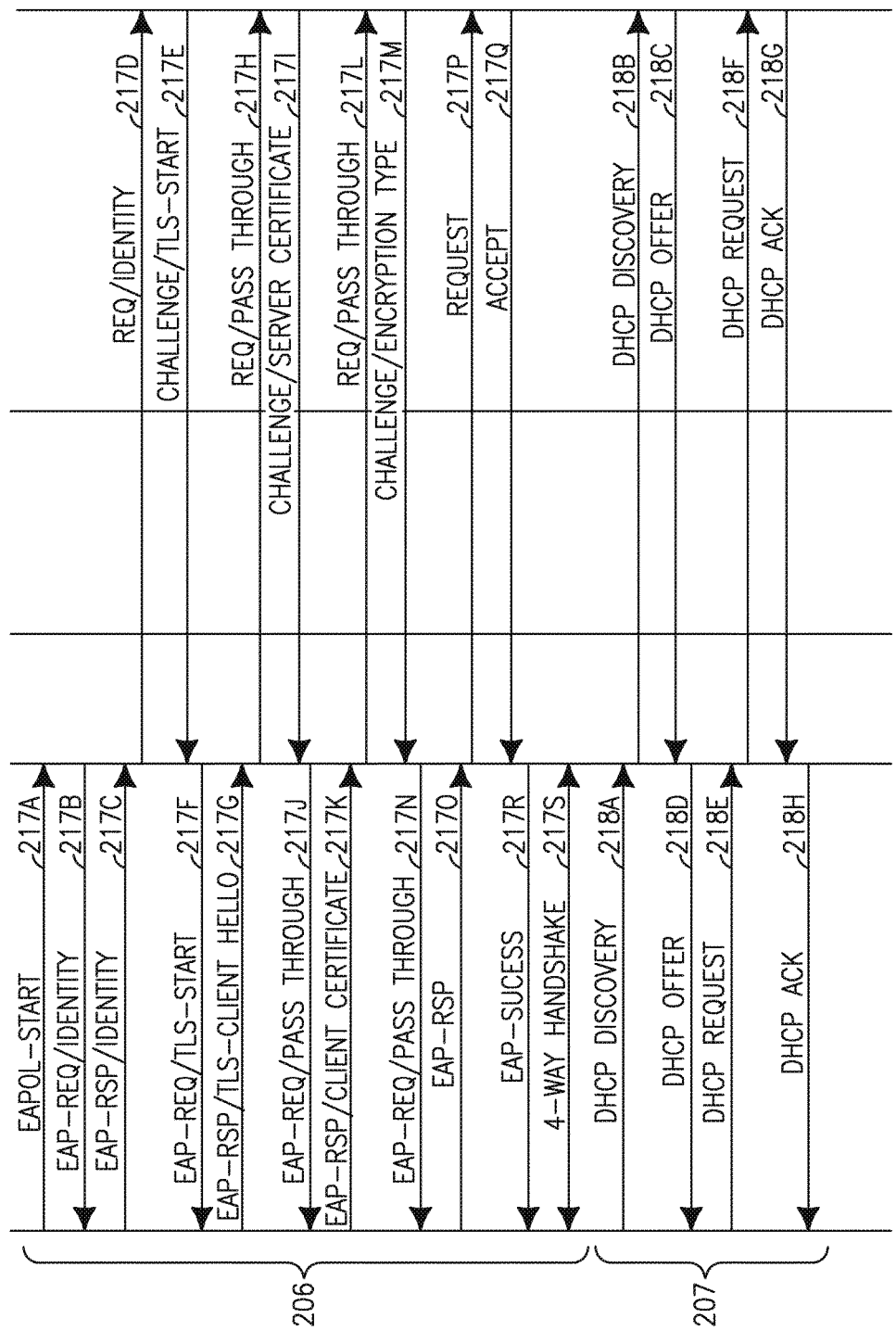
FIG. 2B is a continuation of the example IEEE 802.11 setup procedure shown in FIG. 2A.

FIGS. 2A and 2B are diagrams of an example IEEE 802.11 link setup procedure where the 802.11i/Extensible Authentication Protocol (EAP) may be used. This example procedure 200 may include an AP discovery phase 201, a network discovery phase 202, an additional time sync function (TSF) phase 203, an authentication phase 204, an association phase 205, a security setup phase 206, and an IP setup phase 207. A wireless communication system may include one or more stations (STA)s 208, one or more APs 209a, 209b, 209c, and one or more network elements 209d. A STA 208 may include a wireless transmit receive unit (WTRU) or a non-AP STA, and a network element 209d may include, for example, a router, a home agent (HA), an authentication, authorization, and accounting (AAA) server, an authentication server (AS), or a remote authentication dial-in user service (RADIUS).

In the AP discovery phase 201, the STA 208 may use active or passive scanning to find APs in range. In an active scanning example, the STA 208 may transmit respective probe request frames 211a, 211b, 211c to AP1 209a, AP2 209b, and APn 209c. In response, each AP may transmit a respective probe response frame 212a, 212b, 212c to the STA 208. In a passive scanning example, the STA 208 may wait to receive respective beacons 210a, 210b, 210c from AP1 209a, AP2 209b, and APn 209c prior to performing a probe request/response frame exchange.

In the network discovery phase 202, the STA 208 may search for the proper service provider network by transmitting a guarded action system (GAS) initial request frame 213a to, for example, AP1 209a. In response, AP1 209a may transmit a query request 213b to network element 209d, and receive a query response 213c. In response to receiving the query response 213c, AP1 209a may transmit a GAS initial response frame 213d to STA 208. The STA 208 may transmit a GAS comeback request frame 213e to AP1 209a and receive a GAS comeback request frame 213f in response. If necessary, one or more GAS comeback request/response exchanges 213g may be performed, for example, if the GAS response is too large to fit into one MAC management protocol data unit (MMPDU) and GAS fragmentation is used for delivery.

An additional TSF phase 203 may be performed. During the TSF phase 203, STA 208 may transmit a probe request frame 214a to, for example, AP1 209a, and receive a probe response frame 214b in response. The additional TSF phase may be used to further synchronize the time synchronization timers between, for example, AP1 209a and STA 208. The synchronization may be performed by using a timestamp field in the probe response frame 214b.

An authentication phase 204 may be performed. During the authentication phase 204, STA 208 may transmit an authentication request frame 215a to, for example, AP1 209a, and receive an authentication response frame 215b in response.

An association phase 205 may be performed. During the association phase 205, STA 208 may transmit an association request frame 216a to, for example, AP1 209a, and receive an association response frame 216b in response.

A security setup phase 206 may be performed. STA 208 may initiate the security setup phase 206 by transmitting an extensible authentication protocol (EAP) over local area network (LAN) (EAPOL) start frame 217a to, for example, AP1 209a. AP1 209a may transmit an EAP request frame 217b to STA 208. The EAP request frame 217b may include a field that indicates an identity of AP1 209a. The STA 208 may transmit an EAP response frame 217c to AP1 209a in response. The EAP response frame 217c may include a field that indicates an identity of STA 208. AP1 209a may transmit a request frame 217d to a network element 209d using an AAA protocol, for example. The request frame 217d may include a field that indicates an identity of the STA 208.

The network element 209d may transmit a challenge/transport layered security (TLS) start frame to AP1 209a in response. AP1 209a may transmit an EAP request/TLS start frame 217f to STA 208. In response, STA 208 may transmit an EAP response/TLS client hello frame 217g to AP1 209a. AP1 209a may transmit a request/pass through frame 217h to network element 209d, and receive a challenge/server certificate frame 217i in response. AP1 209a may transmit an EAP request/pass through frame 217j to STA 208, and receive an EAP response/client certificate frame 217k in response.

AP1 209a may transmit a request/pass through frame 217l to the network element 209d, and receive a challenge/encryption type frame 217m in response. AP1 209a may transmit an EAP request/pass through frame 217n to STA 208, and receive an EAP response frame 217o in response. AP1 209a may transmit a request frame 217p to network element 209d, and receive an accept frame 217q in response. AP1 209a may transmit an EAP success frame 217r to STA 208. In response to the EAP success frame 217r, STA 208 and AP1 209a may perform a 4-way handshake 217s.

An IP setup phase 207 may be performed to obtain an IP address assignment. For example, STA 208 may transmit a dynamic host configuration protocol (DHCP) discovery frame 218a to, for example, AP1 209a. AP1 209a may transmit a DHCP discovery frame 218b to network element 209d, and receive a DHCP offer frame 218c in response. AP1 209a may transmit a DHCP offer frame 218d to STA 208. STA 208 may transmit a DHCP request frame 218e to AP1 209a. AP1 209a may transmit a DHCP request frame 218f to network element 209d, and receive a DHCP acknowledgement (ACK) 218g in response. AP1 209a may transmit a DHCP ACK 218h to STA 208.

Other EAP methods that provide mutual authentication, for example, EAP-Subscriber Identity Module (EAP-SIM), EAP-Authentication and Key Agreement (AKA) and EAP-Tunneled Transport Layer Security (EAP-TTLS) may also be used.

Some issues have been encountered with 802.11 initial link setup procedures, such as the example protocol illustrated in FIG. 2. One issue may include the length of time, for example, up to several seconds or more, required for the 802.11 network to establish an initial connection with a STA. Another issue may be that when a user of a STA is involved in an interactive session, for example, a Skype video, a connection may not be able to be maintained when the STA switches from another network to an 802.11 network, for example, from a Third Generation Partnership Project (3GPP) network to wireless local area network (WLAN). Another issue may be that IEEE 802.11 networks may be required to support a large number of users simultaneously entering an extended service set (ESS) and securely provide them with authentication.

Some goals for 802.11 networks may be set with respect to initial link set up time, minimum user load and robustness in the presence of high background load. With respect to initial link set up time, one example goal may be for the initial link set up time for IEEE 802.11 networks to be less than 100 ms while maintaining a Robust Security Network Association (RSNA) security level where the initial link setup time may be the amount of time required to gain the ability to send internet protocol (IP) traffic with a valid IP address through the AR With respect to minimum user load, an example goal may be for IEEE 802.11 networks to support at least 100 non-AP STAs entering an ESS within one second and to successfully conduct link setup. With respect to robustness in the presence of a high background load, an example goal may be to provide a link setup for media loads of at least fifty percent.

Example methods to reduce the initial link setup time for 802.11 networks are summarized in Table 1. These examples, however, may not be sufficient to meet the 100 ms link setup time goal because, even using aggressive predictions, the possible achievement time for link setup using passive scanning is 90 ms, even without considering the network discovery phase. A realistic time consumption may be significantly longer in real networks where a large number of APs may be present. Further, the IEEE 802.11 link setup protocol illustrated in FIG. 2 is very long and will not satisfy the initial link setup time requirements.

TABLE 1

| Phase | AP Discovery | | | Additional TSF | Auth. & Assoc. | Higher Layer (DHCP/IP) |
| --- | --- | --- | --- | --- | --- | --- |
| | Active scanning | Passive scanning | Network Discovery | | | |
| # of message rounds | 1+, STA-AP Per AP per Channel | 1.5, STA-AP Per AP per channel | 2+, STA-AP 1, AP-AS Per AP | 1, STA-AP | 7~13, STA-AP 4+, AP-RADIUS | 2, STA-AP 2, AP-DHCP server |
| Time (Today) | Mean: 102 ms for 2.4 GHz: n/a for 5.8 Worst case: 680 ms | Mean: 1100 ms for 2.4 GHz:; 2300 ms for 5.8 GHz; Worst case: 3400 ms | 5 ms to 30 ms per AP Multiple AP: n/a | 2 ms to 5 ms | 15 ms to 2 s Extensible Authentication Protocol Generalized Pre-Shared Key (EAP-GPSK) @ OFDM6: 6 ms + 71 ms processing time, where OFDM6 may be a mode in 802.11PHY with a minimum data rate of 6 Mbps | ~100 ms |
| Possible achievement (with knowledge) | 2 ms (possible at 5 GHz) | 50 ms | Optimizations for large number of users simultaneously entering a network | | EAP-GPSK w/ Piggyback@ OFDM6: 5 ms + 35 ms processing time (reduced number of messages require less processing time, further optimization might be possible) | |

Referring to Table 1, time values shown in the "possible achievement" row may be based on, for example, 802.11ai.

Although the 802.11 Authentication Phase may be removed when RSNA is used, the Authentication Phase may nevertheless be performed to aid in backward compatibility. The IP address assignment may be combined into earlier Phases of the link setup process in 802.11ai.

Example Internet Engineering Task Force (IETF) procedures may include DHCP with rapid commit to optimize IP Assignment Phase, which is a fast IP Assignment scheme. Configuration change counts (CCC)s or configuration sequence numbers may be used for the GAS configuration and/or AP configuration to optimize the system information communication between the STA and the AP/Network.

802.11ai procedures may not be sufficient to achieve the requirements of an initial link setup time of less than 100 ms. This may be because the current "possible" achievement time for link setup using passive scanning is 90 ms, even without considering the network discovery phase. In addition, the numbers given in the "possible achievement" row are very aggressive, for example, 2 ms for active scanning. A realistic time consumption may be significantly longer in real networks where there may be a large number of APs present. Some or all phases in the link setup process may be initiated by the STA. The AP may respond to a STA request, and may not have a mechanism to enable the AP to initiate an optimization in the link setup process. Most of the phases in the current 802.11 link setup process may be further optimized for faster link setup time while maintaining an RSNA level of security.

The current initial link setup process is very long and may not satisfy the initial link setup time requirements. Accommodation of a large number of users simultaneously entering the ESS may not be possible within the link setup time frames that have been identified. A method and apparatus that optimizes the link setup process using a dynamic, flexible, and interoperable procedure is needed.

The link setup process in 802.11 may not allow optimization of the process that includes the elimination of some steps or phases at the AP. For example, in 802.11, all phases in the link setup process may be initiated by STA as shown in FIG. 2A.

The system configuration may be defined. For example, the configuration change count or configuration sequence number may be defined. Further, in IEEE 802.11 an example initial setup procedure such as the protocol illustrated in FIG. 2A and FIG. 2B, all phases in the link setup process may be initiated by the STA. The AP only responds to a STA request, and, therefore, may not have a mechanism to initiate optimizations in the link setup process. Further yet, accommodation of a large number of users simultaneously entering the ESS may not be possible within the link setup time frames that have been identified, for example, 100 ms.

In addition to the above, with the increasing demand for mobility, and increased availability of multimode devices with multiple wireless interfaces, for example, 3GPP and IEEE 802.11, seamless handover and service continuity across these networks may become a differentiating service for an operator to offer to its users. Secure access procedures to 802.1x/EAP WLAN networks may suffer from lack of automation, significant added latency, non-seamless handoff, and disruption of previously established services over cellular networks, for example, voice over internet protocol (VoIP) sessions as a result of a handoff that often require user interaction, pre-provisioning devices, and WLAN networks with credentials.

One or more embodiments disclosed herein may speed up initial link setup for 802.11 devices by using information that the AP and/or STA pre-acquires. APs and/or STAs may pre-acquire certain information about each other. For example, a STA may switch from its previous connection, such as a 3G network, to a WLAN network, or from one AP to another AP in an ESS. In this example, it may be possible for a suitable or preferred WLAN AP to pre-acquire certain information about the candidate STA. It may also be possible for a STA to pre-acquire knowledge about a preferred AP based on, for example, geography locations and network access history, including but not limited to frequently visited places, daily routines, etc.

With an AP and/or STA pre-acquiring such information, it may be possible to skip and/or combine certain phases in the link setup procedure. In addition, depending on what and how much information an AP and/or STA has pre-acquired, various optimizations may be applied to a link setup procedure to reduce the link setup time. Such a shortened or optimized procedure may also be initiated by the AP.

Figure 3:
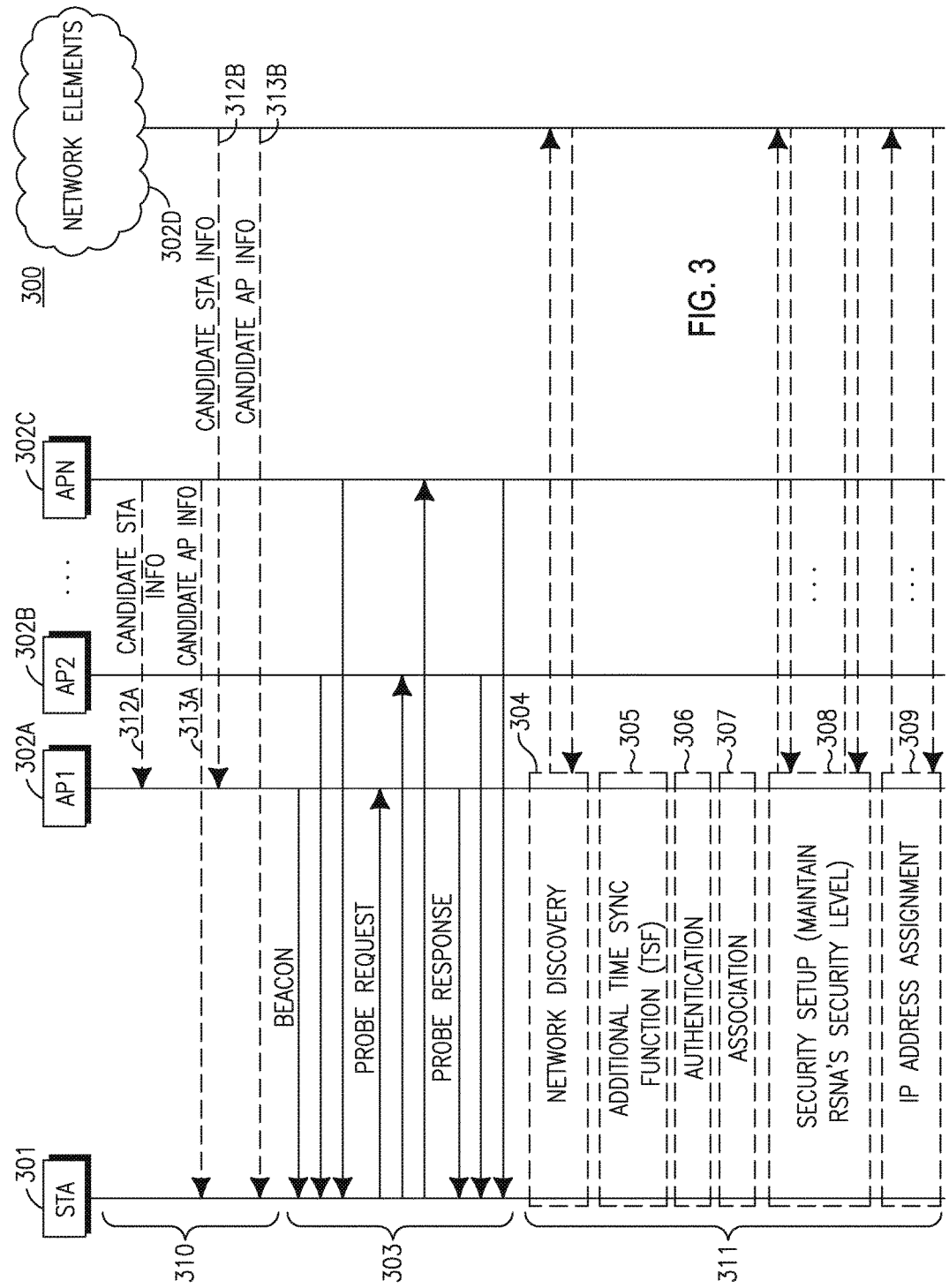
FIG. 3 is a flow chart of a baseline procedure for accelerated link setup (ALS) using pre-acquired information.

FIG. 3 is a flow chart of a baseline procedure for accelerated link setup using pre-acquired information. A wireless communication system may include one or more stations STAs 301, one or more APs 302a, 302b, 302c, and one or more network elements 302d. A STA 301 may include a wireless transmit receive unit (WTRU), and a network element 302d may include, for example, a router, a home agent (HA), an AAA server, an AS, or a RADIUS.

In the example procedure 300 illustrated in FIG. 3, an APn 302c may initiate link setup optimizations by using pre-acquired information about a STA 301. Further, the example procedure illustrated in FIG. 3 may accommodate multiple variants of accelerated link setup procedures in a dynamic, flexible, and interoperable manner while maintaining backward compatibility.

With respect to the link setup procedure illustrated in FIG. 2, the baseline procedure for accelerated link setup (ALS) using pre-acquired information illustrated in FIG. 3 may be driven by entities other than the STA 301. If no information on a STA or AP has been pre-acquired, then the ALS may function as an 802.11 link setup procedure that includes an AP discovery phase 303, a network discovery phase 304, an additional TSF phase 305, an authentication phase 306, an association phase 307, a security setup phase 308, an IP setup phase 309. If, however, the AP has performed a pre-acquired information phase 310 to obtain information about the STA 301 or vice versa, the STA 301 and AP may optimize the AP discovery phase 303 using the pre-acquired information. In addition, the AP and STA may negotiate to skip or shorten the post-AP-discovery phases, for example, network discovery phase 304, additional TSF phase 305, authentication phase 306, association phase 307, security setup phase 308, and IP setup phase 309, depending on the amount of the information that the STA and AP have acquired with respect to each other.

For example, if a STA is conducting an interactive Skype call on a 3G cellular network, the STA may switch to the WLAN network if it arrives at a location where there are strong signals from a preferred AP. The STA and the preferred AP may pre-acquire information about each other prior to link setup through the 3G network, such as security related parameters, available network services, etc. Given the pre-acquired information, the STA may actively scan for only the preferred AP instead of scanning for all available APs in the area, which may significantly shorten the AP discovery process. Further, since the STA and AP may have already pre-acquired security related parameters and available network services information, they may skip the network discovery phase 304, additional TSF phase 305 (since TSF may be conducted during the initial probe request/probe response exchange) and the security setup phase 308, achieving even faster link setup, while maintaining the required RSNA level of security.

The example baseline procedure illustrated in FIG. 3 may include a pre-acquiring information phase 310, an AP discovery phase 303 and a post-AP discovery phase 311. In the pre-acquiring information phase 310, APs and/or STAs may acquire knowledge about each other through interfaces other than the IEEE 802.11 air link directly between them. The pre-acquiring information phase 310 may not count as part of link setup time and may be performed any time before the link setup between the AP and the STA. The pre-acquiring information phase 310 may not necessarily occur just prior to the link setup. In the AP discovery phase 303, the STA 301 may find a proper AP with or without pre-acquired information. If pre-acquired information is available, AP discovery may be optimized accordingly and the specific procedure for the rest of the link setup process may be communicated and negotiated between the AP and STA. Otherwise, the AP discovery procedure 303 and the rest of the link setup phases may be used to maintain backward compatibility. The post-AP discovery phase 311 may include all remaining phases for setup of IP connectivity between the STA and the AP, such as network discovery 304, additional TSF 305, authentication 306, association 307, security setup 308, and IP setup 309. The Post-AP discovery phase 311 may be flexibly structured such that none of its phases are mandatory. In order to accelerate the link setup process, each of the phases may be skipped or optimized depending on the availability and the amount of the information pre-acquired about the STA and the AP. In addition, the ALS procedure illustrated in FIG. 3 provides a framework for combined phases or a newly defined procedure. The selection of a specific procedure for a link setup case may be communicated between the AP and the STA through the proposed signaling mechanisms at the completion of the AP discovery step.

Referring to FIG. 3, STA 301 and AP1 302a may pre-acquire information in the pre-acquiring information phase 310. For example, if the STA 301 is connected to a WLAN, AP1 may receive candidate STA information 312a from APn 302c, and STA 301 may receive candidate AP information 313a from APn 302c. In another example, if the STA is connected to a cellular network, for example, a network element 302d, AP1 302a may receive candidate STA information 312b from network element 302d, and STA 301 may receive candidate AP information 313b from network element 302d.

The candidate STA information 312a, 312b may be pre-acquired knowledge about a candidate STA that, for example, AP1 302a may communicate with at some point in the future. The candidate STA information 312a, 312b may include, for example, the medium access control (MAC) address of the candidate STA, a capability of the candidate STA, security information, and/or a service package. The candidate AP information 313a, 313b may be pre-acquired knowledge about a candidate AP that STA 301 may communicate with at some point in the future. The candidate AP information 313a, 313b may include, for example, a service set identification (SSID), a basic service set identifier (BSSID), an AP capability, a physical (PHY) mode, one or more rates, security information, access network services information, and any other information that may be included in a beacon or probe response frame. The candidate STA information 312a, 312b and the candidate AP information 313a, 313b may also include information shown in Table 2 below.

An accelerated link setup (ALS) capability indicator may be used to indicate whether or not ALS is supported by STAs, including AP and non-AP STAs. The ALS indicator may include, for example, bit flag information that may be encoded in an existing information field by using a reserved bit. For example, the reserved bit may be the capability information field of the beacon frame. The reserved bit may also be encoded in one or more information fields or information elements (IE)s.

The AP and the STA may use the ALS capability indicator to inform each other about their ALS capabilities so that an ALS procedure may be triggered effectively. At initial link setup, both the AP and the STA may send ALS capability indicator information at their earliest possible opportunity. For example, an AP may send an ALS capability indicator in beacon frames and/or probe response frames while a STA may send an ALS capability indicator in probe request frames and/or other management/control frames as an initial frame to the AP.

IEs may be used to aid ALS procedures, and may include, for example, an I-know-you IE, an I-know-you-response IE, a Need-more-info IE, and a Need-more-info-response IE. These IEs may be included in management frames and may be transmitted over the WLAN air link between two STAs, including AP and non-AP STAs.

The I-know-you IE may allow the AP and/or the STA to notify the other at an early stage of initial link setup that it has pre-acquired information about the other. When an I-know-you IE is used by an AP, it may be sent in a first unicast frame from the AP to the STA, for example, a probe response or an authentication response, to notify the STA what information the AP has already pre-acquired. This information may include, for example, that the AP may know the STA identity such as a 48-bit MAC address; the AP may know the service needs of the STA and the ability of the AP to provide those services; that the AP and the STA share a credential/key, etc., and/or what information is needed, for example, the AP may need more information about the STA, such as confirmation from the STA and/or knowledge of the STA regarding the shared keys, etc. When an I-know-you IE is used by the STA, it may be transmitted in a first message from the STA to the AP, notifying the AP what information the STA has pre-acquired about the AP, for example, that the AP is the preferred AP of the STA; the STA has pre-acquired the MAC/PHY parameters of the AP; that the STA has a shared credential/key with the AP, that the STA is providing the AP with information about the STA and/or what information the STA still needs from the AP.

In addition, an I-know-you IE may also include a suggestion from its transmitter regarding how to pursue the remaining link setup process. For example, the suggestion may include a specific procedure to complete the link setup process, and may be based on the pre-acquired information.

An I-know-you-response IE may be a response to an I-know-you IE that may require further information. Such a response may include one or more confirmations, additions, and/or corrections to the information items listed in a received I-know-you IE.

A Need-more-info IE may allow the AP and the STA to further exchange information to aid ALS if messages with I-Know-You and I-Know-You-Response IEs do not complete the necessary information communications. For example, to negotiate how to complete the link setup process, the AP and/or the STA may need another round of message exchanges to reach an agreement. The Need-more-info-response IE may be a response to a Need-more-info IE or an I-know-you-response IE that may request further information.

A beacon transmission protocol may be performed to reduce system overhead and aid fast initial link setup. For example, a short beacon may be transmitted in addition to a regular beacon. Contents of the short beacon may be minimized to reduce system overhead and carry essential information for fast initial link setup. In this example, a short beacon may be transmitted as frequently as demanded by link setup delay requirements and, as such, may replace the regular primary beacon in one or more consecutive beacon cycles, replace the regular primary beacon in a periodic manner, or may be transmitted more frequently than the regular primary beacon. In addition, the short beacon contents may be influenced by an AP aware mode where the AP may have advance information about one or more STAs. A short beacon may include information relevant to one or more of: AP discovery; network discovery; security, for example, authentication and association; higher layer protocol to speed up the link setup process; I-know-you IE; I-know-you-response IE; Need-more-info IE; and/or Need-more-info-response IE.

An example short beacon frame 400 supporting ALS is illustrated in FIG. 4. For example, the short beacon frame 400 may include an optimized/minimized header 410, a primary beacon related information field 420, an optimized/minimized subset of primary beacon content field 430, an AP discovery information field 440, a network discovery information field 450, a security related information field 460, a higher layer protocol information field 470, and one or more optional elements field 480. The AP discovery information field 440, network discovery information field 450, security related information field 460, and/or higher layer protocol information field 470 may be included in the short beacon frame 400 on an as needed basis.

In another example, a beacon frame may be modified to aid fast initial link setup. For example, a primary beacon may be modified to allow it to include essential information for fast initial link setup. In this example, the beacon contents may be influenced by an AP aware mode where the AP may have advance information about one or more STAs. The beacon may include information relevant to one or more of: AP discovery; network discovery; security, for example, authentication and association; higher layer protocol to speed up the link setup process; I-know-you IE; I-know-you-response IE; Need-more-info IE; and/or Need-more-info-response IE.

An example modification to a primary beacon frame 500 supporting ALS is illustrated in FIG. 5. For example, the primary beacon frame 500 may include a header 510, a primary beacon content field 520, a short beacon related information field 530, an AP discovery information field 540, a network discovery information field 550, a security related information field 560, a higher layer protocol information field 570, and/or one or more optional elements field 580. The short beacon related information field 530, AP discovery information field 540, network discovery information field 550, security related information field 560, and/or higher layer protocol information field 570 may be included in the primary beacon frame 500 on an as needed basis.

In addition, an ALS capability indicator may be included in the beacon frames, in both the short beacon and the modified primary beacon. The ALS capability indicator may be either encoded in the capability information field of the beacon frame by using a reserved bit or encoded in other information fields or information elements in the beacon frames.

IEEE 802.11 management frames that are typically used in link setup may be modified to aid fast initial link setup (FILS). For example, association/re-association and probe request and response messages may be modified to aid FILS by including information relevant to one or more of AP discovery; network discovery; security, for example, authentication and association; higher layer protocol to speed up the link setup process; I-know-you IE; I-know-you-response IE; Need-more-info IE; and/or Need-more-info-response IE.

An IEEE 802.11 measurement pilot frame to assist STAs with scanning may be modified to aid FILS. The measurement pilot frame may be a public action frame that may include a subset of the information included in a primary beacon and may be transmitted more often than the primary beacon. For example, the measurement pilot may be modified to aid FILS by including information relevant to one or more of AP discovery; network discovery; security, for example, authentication and association; higher layer protocol to speed up the link setup process; I-know-you IE; I-know-you-response IE; Need-more-info IE; and/or Need-more-info-response IE.

In addition, other IEEE 802.11u frames, such as generic advertisement service (GAS) initial request/response and GAS comeback request/response frames, may be modified to aid FILS by including information relevant to one or more of AP discovery; network discovery; security, for example, authentication and association; higher layer protocol to speed up the link setup process; I-know-you IE; I-know-you-response IE; Need-more-info IE; and/or Need-more-info-response IE.

In another example, a management frame to aid FILS, referred to as a FILS management frame, may include information relevant to one or more of AP discovery; network discovery; security, for example, authentication and association; higher layer protocol to speed up the link setup process; I-know-you IE; I-know-you-response IE; and/or Need-more-info IE. The FILS management frame may be defined and implemented as a FILS management action frame with the action defined as supporting the FILS function. The FILS management action frame may include one or more of the following modes: a regular mode that requires an acknowledgement (ACK) response and a No ACK mode that will not require an ACK response from the receiver.

A FILS management action frame may be a public action frame. A FILS management action frame may be used for an inter-Basic Service Set (inter-BSS) and AP information exchange with an unassociated-STA. Examples of such information exchange scenarios may include the transmitting STA or AP and receiving STA or AP being associated with different BSSs and one or both of the transmitting and receiving STAs not being associated to a BSS. A FILS management action frame may also have a dual protected mode, which may be used for STA to STA communication.

An example FILS management action frame 600 is illustrated in FIG. 6. For example, the FILS management action frame 600 may include a category field 610, an action field 620, an AP discovery information field 630, a network discovery information field 640, a security related information field 650, a higher layer protocol information field 660, and one or more optional elements field 670. The category field 610 may indicate, for example, that the FILS management action frame is a public action frame. The action field 620 may indicate a FILS action. The AP discovery information field 630, network discovery information field 640, security related information field 650, and/or higher layer protocol information field 660 may be included in the FILS management action frame on an as needed basis.

A FILS management action frame may be transmitted by an AP and may be transmitted in a unicast or a broadcast mode. The AP may transmit the FILS management action frame as frequently as needed to support efficient operation of FILS in the BSS/system.

In another example, a FILS management action function may be supported by a FILS request frame and a FILS response/report frame. A device transmitting a FILS request frame may request information relevant to one or more of: AP discovery; network discovery; security, for example, authentication and association; higher layer protocol to speed up the link setup process; I-know-you IE; I-know-you-response IE; and/or Need-more-info IE. A device transmitting a FILS response/report frame may respond with or report information relevant to one or more of: AP discovery; network discovery; security, for example, authentication and association; higher layer protocol to speed up the link setup process; I-know-you IE; I-know-you-response IE; Need-more-info IE; and/or Need-more-info-response IE.

Information pre-acquired by an AP and/or a STA may be used to effectively optimize AP discovery. For example, a STA may obtain preferred AP information through multiple mechanisms, such as a connection to a network before switching to a WLAN network, and memorized historic data with APs and locations, etc. At a STA, pre-acquired information may be classified into two major types: air interface MAC/PHY parameters, for example, those in beacon and/or probe response frames such as service set identification (SSID)/basic service set identification (BSSID), service offerings, capability, PHY parameters, supported rates, quality of service (QoS) capability, etc., and security-related information, for example, robust security network (RSN) information, shared key/credential with expiration time and/or valid authentication context with expiration time. A minimum pre-acquired information at the STA may include a MAC address of a preferred AP, for example, the BSSID. Other information items may be available and used in an incremental manner.

If the BSSID of the AP is the only information that a STA has pre-acquired with respect to the coverage area of the AP, the AP discovery process may be optimized from at least two aspects. First, the STA may transmit a unicast probe request frame (not wildcard). Second, the AP discovery process may be returned once the probe response frame is received confirming its preferred AP selection, without a need to scan all the available APs in the area. If the BSSID of the AP and any other information items have been pre-acquired by the STA, further optimizations may be applied to AP discovery.

Figure 7:
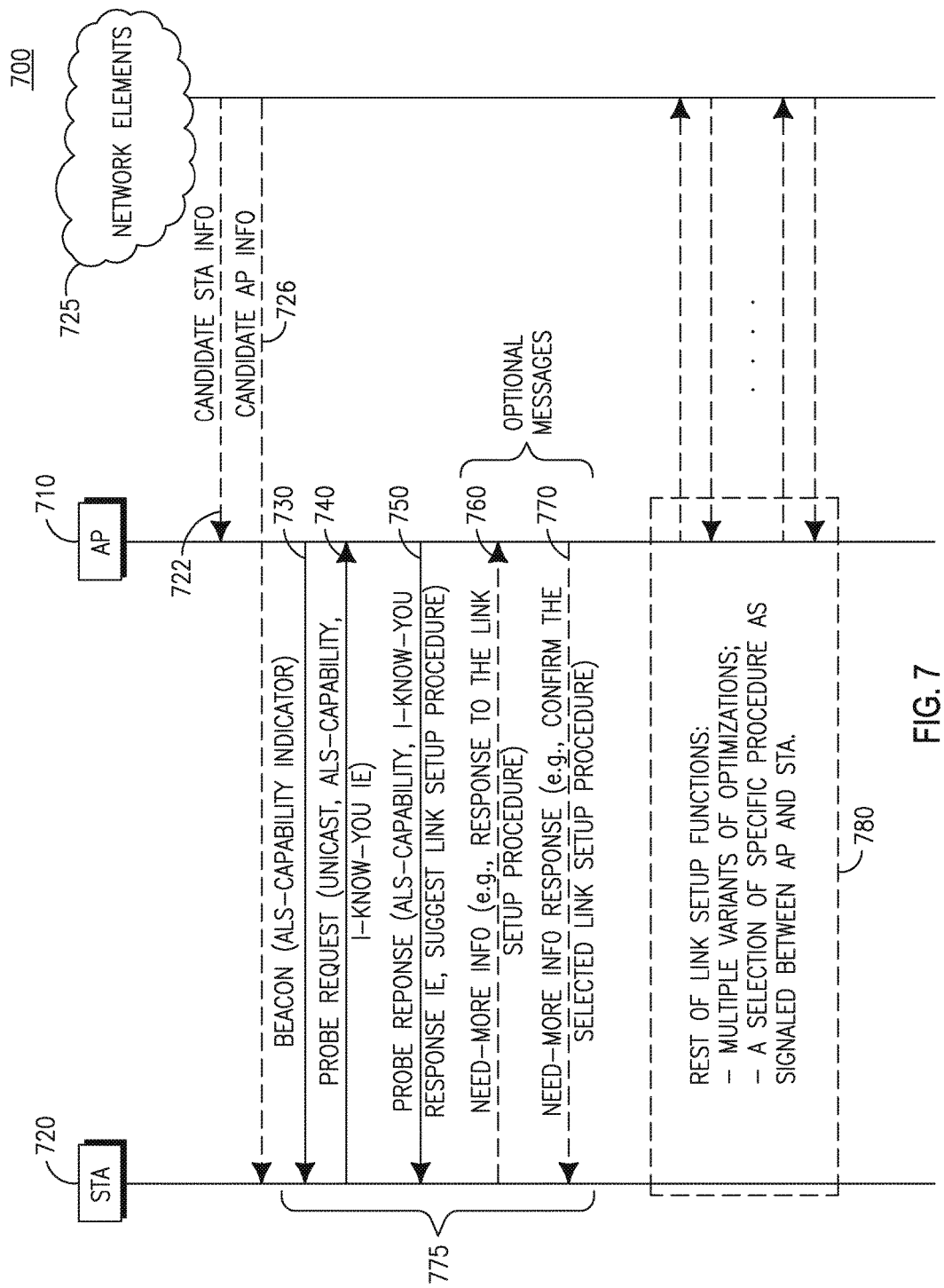
FIG. 7 is a diagram of an example of an optimized access point (AP) discovery procedure initiated by a STA based on pre-acquired knowledge.

FIG. 7 is a diagram illustrating an example AP discovery method 700 with pre-acquired knowledge of the AP. In this example, the AP 710 and/or the STA 720 may have pre-acquired information from a previous connection to a network, for example 3G, other WLAN AP, etc. The pre-acquired information may also be from the memory of the STA 720 and its current location. Pre-acquired information may be obtained in a variety of ways. In one example, the AP 710 may receive a message that includes candidate STA information 722 from a network element 725. In another example, the STA 720 may receive a message that includes candidate AP information 726 from the network element 725.

Referring to FIG. 7, the STA 720 may receive a beacon 730 from the AP 710. The beacon 730 may include an ALS capability indicator. The STA may transmit a unicast request frame 740 to the AP 710. The unicast request frame 740 may be a probe request frame, and may include an I-Know-You IE. The unicast request frame 740 may be a new MAC management frame or a modified 802.11 MAC management frame. The I-Know-You IE may include the information items about the knowledge of the STA regarding the AP to seek confirmations and/or corrections from the AP, and it may also include request indicators to ask for further information from the AP.

When the AP 710 receives such a request frame with an I-Know-You IE from the STA 720, the AP 710 may transmit a response frame 750 back to the STA 720. The response frame 750 may include an I-Know-You-Response IE including further details regarding how to complete the link setup process. Another round of message exchanges may be used for the AP 710 and the STA 720 to gain further information about each other and reach an agreement regarding how to complete the link setup procedure. For example, the STA 720 may transmit a need-more information request frame 760, and receive an need-more information response frame 770 from the AP 710 in response. When the AP discovery phase 775 is completed, the rest of the link setup 780 may be performed.

In this example, the AP discovery phase 775 may be completed in one or two message rounds between the STA and the AP and take approximately 4 ms to 10 ms to complete. Additionally, in such AP discovery phase 775, the pre-acquired knowledge may be applied to derive an optimized way to complete the rest of link setup functions by the AP 710 and the STA 720.

An AP may pre-acquire a candidate STA's knowledge through its connections to a network. The pre-acquired information about a STA may include the MAC address of the STA; service requirements; security related information, for example, shared key/credential with expiration time; and/or valid authentication context with expiration time, etc. Similarly, a minimum pre-acquired knowledge that an AP may have about a STA may include the MAC address of the STA. Other information items, for example, a STA capability, one or more service requirements, security information, etc., may be available and used in an incremental manner.

If an AP has pre-acquired knowledge about a STA, for example, either the MAC address of the STA only or its MAC address with additional information items, the AP may initiate an ALS procedure after receiving a first frame from the STA including the MAC address of the STA.

Figure 8:
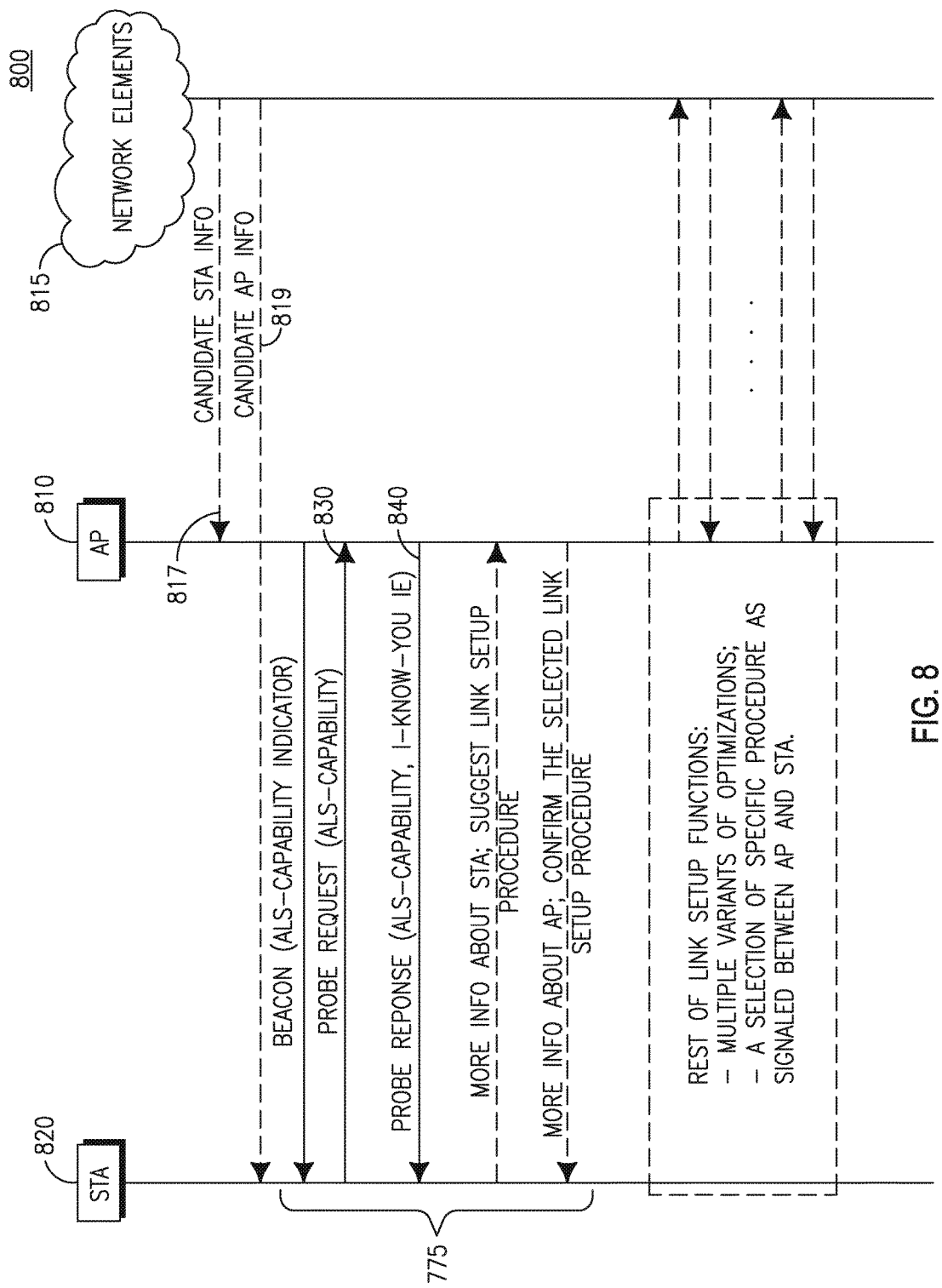
FIG. 8 is a diagram of an example of an optimized AP discovery procedure initiated by an AP based on pre-acquired information.

FIG. 8 is a diagram illustrating an example of optimized AP discovery method 800 initiated by an AP 810 based on pre-acquired information. Pre-acquired information may be obtained in a variety or ways. For example, a network element 815 may transmit a message that includes candidate STA information 817 to the AP 810. In another example, the network element 815 may transmit a message that includes candidate AP information 819 to STA 820.

In the example illustrated in FIG. 8, when an AP 810 receives a first frame 830, for example a probe request frame, from a STA 820 including the MAC address of the STA 820, if the AP 810 has pre-acquired information about the STA 820, the AP 810 may transmit a response frame 840, for example, a probe response frame. The response frame 840 may include an I-Know-You IE that indicates that it may be the correct AP for the STA 820. The I-Know-You IE may be used to request further information from the STA 820. The first frame 830 and the response frame 840 may each include an ALS capability indicator. When receiving such a response from the AP 810, the STA 820 may terminate the scanning process so that the time used for scanning may be significantly reduced. The AP 810 and STA 820 may perform further information exchanges. For example, the STA 820 may transmit a frame 850 that includes more information about the STA. The frame 850 may include a suggestion for a link setup procedure. In response, the AP 810 may transmit a frame 860 in response. The frame 860 may include a confirmation of the suggested link setup procedure.

In addition, through a response of the STA 820 to an I-Know-You IE of the AP 810, and further information exchanges between the AP 810 and the STA 820 if needed, the AP 810 and the STA 820 may reach an agreement regarding how to complete the link setup process in a time efficient manner. For example, the AP 810 and STA 820 may agree to skip, optimize, or combine certain link setup phases. In this way, the AP 810 may successfully apply its pre-acquired information to actively participate in determining how to optimize the link setup process.

Post-AP-discovery link setup optimizations may vary with the available information that an AP and a STA may have pre-acquired prior to AP discovery and during an AP discovery phase. Table 2 provides example post-AP-discovery link setup optimizations based on different assumptions of pre-acquired knowledge.

TABLE 2

| Phase | Function | Optimization Considerations |
|---|---|---|
| Network Discovery | Find a right service provider network | May be skipped if the AP knows the service need of the STA and also knows the connected network can provide the services |
| Additional TSF | Further time synchronization with the selected AP | May be skipped depending on the air link status; the AP may also inform the STA if it can be skipped |
| 802.11 Authentication | Verify the STA, but not useful for RSNA | may be skipped if RSNA is used |
| 802.11 Association | Check RSN info provided by the STA, also assign association identifier (AID) | may be combined into the last message round in AP-discovery phase; may also be another standalone message round, but may be used to carry some information items for the next link setup phases, e.g., EAP/802.1x authentication, and/or IP address assignment |
| EAP/802.1x authentication & Security | EAP authentication, plus Keys/ parameters setup | Multiple variants of possible optimizations, e.g.: skipped or shortened, if upper layer session keys are provided Fast EAP using STA pre-established security association with a network Fast EAP authentication and Fast Key provisioning using STA pre-established security association with a network Fast network discovery and fast EAP authentication using STA pre-established security association with the network; Fast network discovery, fast EAP authentication, and fast key provisioning using STA pre-established security association with a network Optimization to a 4-Way handshake protocol by reducing number of EAPOL-Key frame messages exchanged between the AP and the STA from four to two. This may be achieved by leveraging a pre-established master key shared between a network and a STA to derive pairwise master key (PMK) and GMK keys. |
| IP address assignment | Assign IP address to the STA | The IP address can be assigned via the eANDSF over the cellular network The AAA server may send the IP address to the STA in an EAP message. Combined into previous phases, e.g., through piggybacking Layer-2 information element Optimized through some fast IP address assignment schemes |

Established security association between a STA and a network, for example, a cellular network, may be leveraged to enable authentication and secure link setup on another network, for example, a WLAN network, in an on-demand and seamless fashion. In one example, a reverse bootstrap of application-layer credentials on a network may be used to generate credentials used in a follow-on new access-layer authentication procedure in another network. An objective in developing the authentication mechanisms may be to optimize the steps and procedures involved and facilitate seamless authentication while roaming across all forms of access networks.

An example of using Single Sign-On (SSO) protocols, for example, OpenID Connect, and reverse bootstrapping may allow a STA to discover and access previously unknown networks such as WLAN networks. There may be no need to pre-provision credentials at a new network since these may be bootstrapped from an already running application service security.

Implementation options for SSO integration with WLAN networks may include use of an AAA server that integrates Identity Provider (OP) and enhanced ANDSF (eANDSF) functionalities and an AAA server integrates OP functionality.

Figure 9:
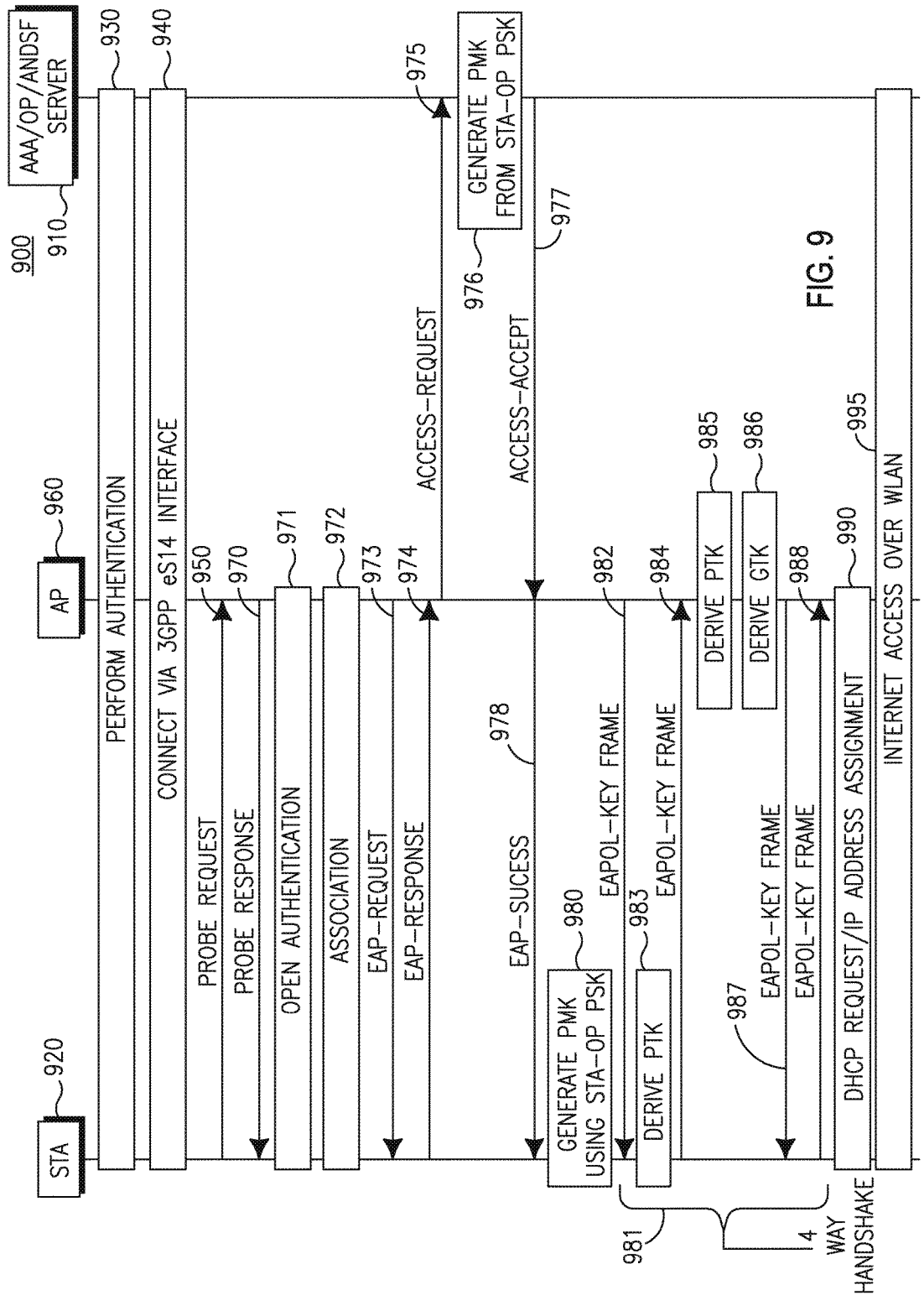
FIG. 9 is a diagram of an example method in which an authentication, authorization, and accounting (AAA) server may integrate Identity Provider (OP) and enhanced access network discovery and selection function (eANDSF) functionalities to enable seamless authentication and fast link setup.

FIG. 9 is a diagram of an example method 900 in which an AAA server 910 may integrate OP and enhanced ANDSF (eANDSF) functionalities to enable seamless authentication and fast link setup. This example may assume that the STA 920 and the OP unit of the AAA server 910 have already established a security association and master keys that may be leveraged for accessing the WLAN network. On a condition that an association between the STA 920 and the OP unit of the AAA server 910 is not established, an active 3GPP connection may be used between the STA 920 and the OP unit of the AAA server 910 to exchange OpenID Connect authentication and generate a master key on both entities.

In a first example, the STA 920 may have successfully completed mutual authentication 930 towards the OP unit of the AAA server 910 over a 3GPP access network and shared Master keys, for example, a pre-shared key (PSK), may have been established on both the STA 920 and OP unit of the AAA server 910. In addition, the STA 920 and the eANDSF unit of the AAA 910 may have a mutually authenticated and established secure connection 940, for example via a 3GPP enhanced S14 (eS14) interface. The STA 920 may request WLAN network information from the eANDSF unit of the AAA server 910 and/or the eANDSF unit of the AAA server may push WLAN network information to the STA over a secure 3GPP connection. The network information may include available APs, SSIDs, authentication method to use, and other access network parameters. Using the information about the available APs and WLAN networks, the STA 920 may not need to perform passive scanning for beacons or perform a lengthy network discovery procedure. The STA 920 may immediately transmit a probe request 950 to a selected AP 960 from a prioritized list provided to the STA 920 by the eANDSF unit of the AAA server 910.

After the STA 920 receives a probe response 970 from the selected AP 960, it may perform open authentication 971 and associate 972 with the selected AP 960. Open authentication 971 may not provide any security measures and may be skipped if an 802.1x/EAP method is used.

The AP 960 may be referred to as the authenticator in this example, and may issue an EAP Request 973 requesting a STA identity. The STA 920 may return an EAP Response 974 that may include a unique identity, for example, an international mobile subscriber Identity (IMSI) with its realm. The realm may include a hint to use SSO authentication, for example, IMSI@sso.MNO.com. The AP 960 may transmit an access request 975 to an AAA server using, for example, a RADIUS access request. The Access Request 975 may include an EAP ID. The OP unit of the AAA server 910 may recognize STA identity and correlate it with the existing security association. The OP unit of the AAA server 910 may decide that the STA 920 is already authenticated, perform fast EAP authentication, and generate a PMK 976 based on the previously generated Master key shared with the STA. The AAA server 910 may transmit an Access Accept message 977 to the AP 960. The Access Accept message 977 may include an EAP success and the key material to the AP 960. The AP 960 may forward an EAP Success message 978 to the STA 920. The STA 920 may generate a PMK 980 using its shared master key with the OP.

The 802.1X/EAP authentication may be completed when the AP 960 transmits an EAP Success message 978 and the AP 960 may initiate a 4-Way Handshake protocol 981 to derive the temporal keys 983, which may include a pairwise transient key (PTK) for encryption of unicast traffic and a group temporal key (GTK) for encryption of broadcast and multicast traffic. The 4-Way Handshake protocol 981 may use four EAPOL-Key frame messages between the AP 960 and the STA 920.

The 4-Way Handshake may use pseudo-random functions (PRF) to hash various inputs to derive pseudo-random values. The PMK may be one of the inputs combined with other inputs to create the PTK on the STA 920 and the AP 960. Some of the other inputs used by the pseudo-random function may be referred to as nonces. A nonce may be a random numerical value that is generated one time only, is used in cryptographic operations, and is associated with a given cryptographic key. For the 4-Way Handshake, a nonce may be associated with the PMK. A nonce may only be used once and may not be used again with the PMK. Two nonces may be created by the 4-Way Handshake, an AP nonce (ANonce) and a supplicant nonce (SNonce). The Snonce may also be referred to as a STA nonce.

To create the PTK, the 4-Way Handshake may use a pseudo-random function that combines the PMK, a numerical authenticator nonce, a supplicant nonce, the authenticator's MAC address (AA), and the supplicant's MAC address (SPA).

In a 4-Way Handshake procedure, the AP and STA may each randomly create their respective nonces. The authenticator, for example AP 960, may transmit an EAPOL-Key frame 982 to the supplicant, for example STA 920. The EAPOL-Key frame 982 may include an ANonce. The STA 920 may now have all the necessary inputs for the pseudo-random function. The STA 920 may derive a PTK 983 from the PMK, ANonce, SNonce, and MAC addresses. The STA 920 may now be in possession of a PTK that may be used to encrypt unicast traffic.

The STA 920 may transmit an EAPOL-Key frame 984 to AP 960. The EAPOL-Key frame may include an SNonce. The AP 960 may now have all the necessary inputs for the pseudo-random function. The STA 920 may also transmit its RSN information element capabilities and a message integrity code (MIC) to the AP 960. The AP 960 may derive a PTK 985 from the PMK, ANonce, SNonce, and MAC addresses. The AP 960 may also validate the MIC. The AP 960 may now be in possession of a pairwise transient key that may be used to encrypt unicast traffic.

The AP 960 may derive a GTK 986 from the group master key (GMK) it may possess. The AP 960 may transmit an EAPOL-Key frame 987 to the STA 920. The EAPOL-Key frame 987 may include the ANonce, the AP's RSN information element capabilities, and a MIC. The EAPOL-Key frame 987 may also include a message to the STA 920 to install the temporal keys. The GTK 986 may be delivered inside the unicast EAPOL-Key frame 987 to the STA 920. The confidentiality of the GTK 986 may be protected because it may be encrypted with the PTK 985. The STA 920 may transmit an EAPOL-Key frame 988 to the AP 960 to confirm that the temporal keys have been installed.

As an optimization to the 4-Way Handshake procedure described above, it may be possible to reduce the number of EAPOL-Key frame messages between the AP and the STA to two. This may be achieved using any of the following example optimizations. The OP unit of the AAA server and the STA may leverage the Master key to derive PMK and GMK keys. The AAA server may transmit both the PMK and the GMK to the AP. The first message of the 4-Way Handshake may be modified to include, in addition to the ANonce, a group nonce (GNonce) randomly generated by the AP. The STA may derive a PTK from the PMK, ANonce, SNonce, and MAC addresses. The STA may also derive a GTK from the GMK, GNonce, and MAC addresses. The STA may now be in possession of pairwise transient keys (PTK, GTK) that may be used to encrypt and decrypt unicast, broadcast, and multicast traffic. The STA may transmit an EAPOL-Key frame including an SNonce to the AP. The STA may also transmit its RSN information element capabilities and a message integrity code (MIC) to the AP. The AP may derive a PTK from the PMK, ANonce, SNonce, and MAC addresses. The AP may also derive a GTK from the GMK, GNonce, and MAC addresses. In addition, the AP may validate the MIC.

At one point during the 4-Way Handshake procedure, both the STA and the AP may have PTK and GTK keys that may be used to encrypt and decrypt unicast, broadcast and multicast traffic. Thus, the remainder of the 4-Way Handshake procedure may not be needed.

At the end of the 4-Way Handshake procedure, the STA 920 may obtain an IP address and necessary configurations 990, for example, one or more domain name servers (DNS)s to use, using a DHCP protocol, and the STA may now access the WLAN network 995.

As a variant to achieve optimization for a STA acquiring its IP address and the necessary configurations, this step may be skipped if the eANDSF provides the IP address and necessary configuration to the STA over a cellular network and the AAA server sends the IP address and necessary configurations to the STA encapsulated into an EAP message, for example, using EAP-Notify message.

Figure 10:
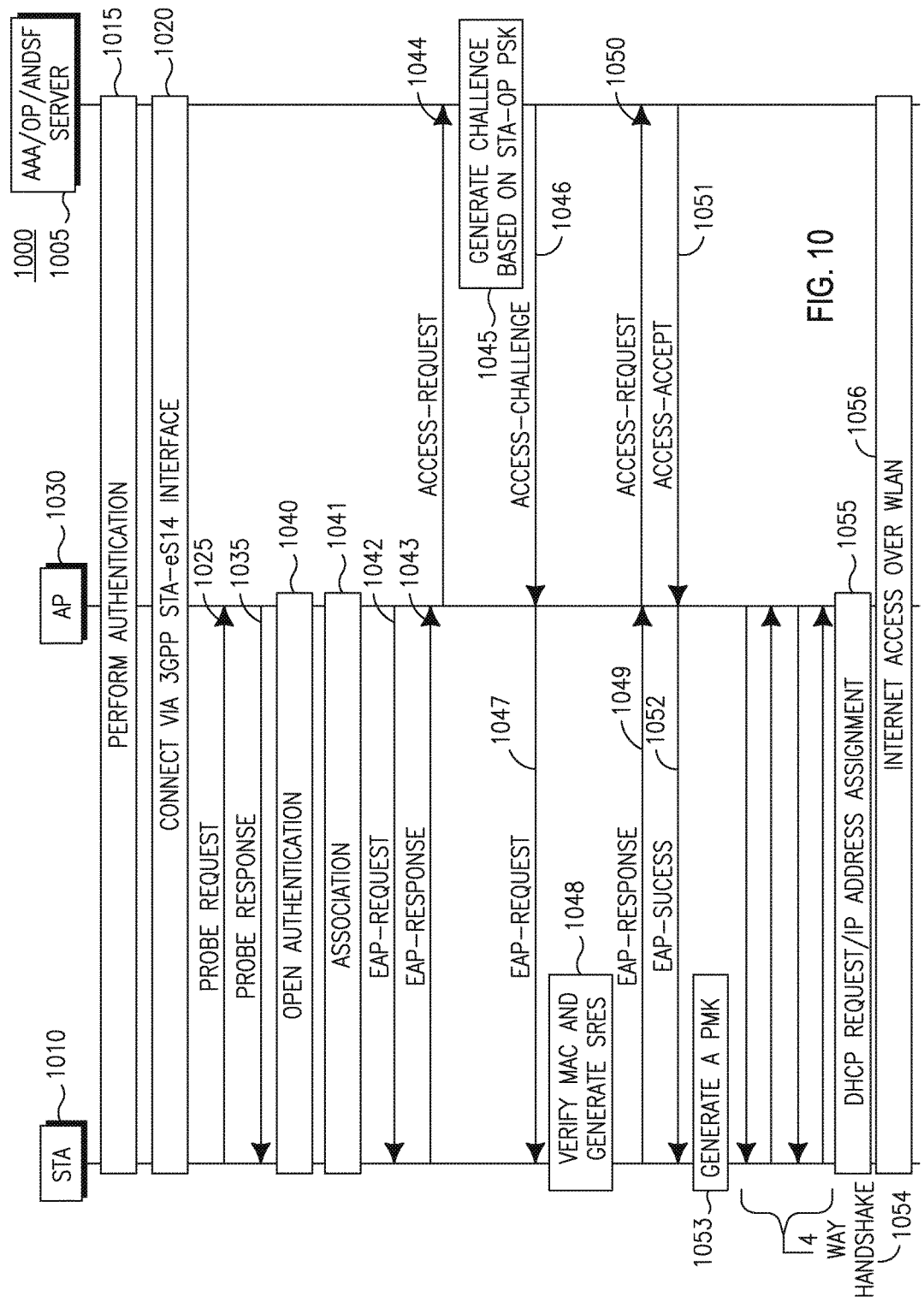
FIG. 10 is a diagram of another example method in which an authentication, authorization and accounting (AAA) server may integrate OP and enhanced access network discovery and selection function (eANDSF) functionalities to enable seamless authentication and fast link setup.

FIG. 10 is a diagram of an example method 1000 in which the AAA server 1005 integrates OP and eANDSF functionalities to enable seamless authentication and fast link setup. This example may assume that the STA 1010 and the OP unit of the AAA server 1005 have already established security association and master keys that may be leveraged for accessing the WLAN network. The STA 1010 may have successfully completed mutual authentication 1015 towards the OP unit of the AAA server 1005 over a network that it may have been previously connected to, for example, a 3GPP access network, and shared Master keys (PSK) may be established on the STA 1010 and the OP unit of the AAA server 1005. In addition, the STA 1010 and the eANDSF unit of the AAA server may be mutually authenticated and a secure connection may be established 1020, for example over a 3GPP STA-eS14 interface. The STA 1010 may request WLAN network info from the eANDSF unit of the AAA server 1005 and/or the eANDSF unit of the AAA server 1005 may push WLAN network information to the STA 1010 over a secure 3GPP connection. The network information may include available APs, SSIDs, authentication method to use, and other access network parameters. Using the information about the available APs and WLAN networks, the STA 1010 may not need to perform passive scanning for beacons or perform a lengthy network discovery procedure. The STA 1010 may immediately transmit a probe request 1025 to a selected AP 1030 from a prioritized list provided to the STA 1010 by the eANDSF unit of the AAA server 1005.

After the STA 1010 receives a probe response 1035 from the selected AP 1030, it may perform open authentication 1040 and associate 1041 with the selected AP 1030. Open authentication 1040 may not provide any security measures and may be skipped if an 802.1x/EAP method is used.

The AP 1030 may be referred to as the authenticator in this example, and may issue an EAP Request 1042 requesting a STA identity. The STA 1010 may return an EAP Response 1043 that may include a unique identity, for example, an international mobile subscriber Identity (IMSI) with its realm. The realm may include a hint to use SSO authentication, for example, IMSI@sso.MNO.com. The AP 1030 may transmit an access request 1044 to an AAA server 1005 using, for example, a RADIUS access request. The Access Request 1044 may include an EAP ID.

The OP unit of the AAA server 1005 may determine that the STA 1010 needs to be re-authenticated before sending an Access Accept message to the AP. Therefore, one or more rounds of EAP-Challenge/Response messages may be exchanged before sending an EAP-Success and keying material to the AP. For example, the AAA server 1005 may generate a challenge based on a STA-OP PSK 1045 and transmit an access challenge message 1046 to AP 1030. The access challenge message 1046 may include an EAP ID and/or an EAP challenge. The AP 1030 may transmit an EAP-Request message 1047 to STA 1010 in response to the access challenge message 1046. The EAP-Request message 1047 may include an identity and/or a challenge. The STA 1010 may receive the EAP-Request message 1047, verify the MAC and generate an SRES 1048, and transmit an EAP-Response message 1049 to the AP 1030. The EAP-Response message 1049 may include an identity and/or a response to the challenge.

The AP 1030 may transmit an access request message 1050 to the AAA server 1005, and receive an access accept message 1051 from the AAA server 1005 in response. The access request message 1050 may include an EAP ID and/or a response to the challenge. The access accept message 1051 may include an EAP ID, an indication of success, and the PMK key to the AP. In response to receiving the access accept message 1051, the AP 1030 may transmit an EAP-Success message 1052 to the STA 1010. In response to receiving the EAP-Success message 1052, the STA 1010 may generate a PMK 1053 using the STA-OP PSK and may perform a 4-way handshake protocol 1054 with the AP 1030, request IP address assignment using DHCP 1055, and access the internet over WLAN 1056, as described in FIG. 9 above.

Figure 11:
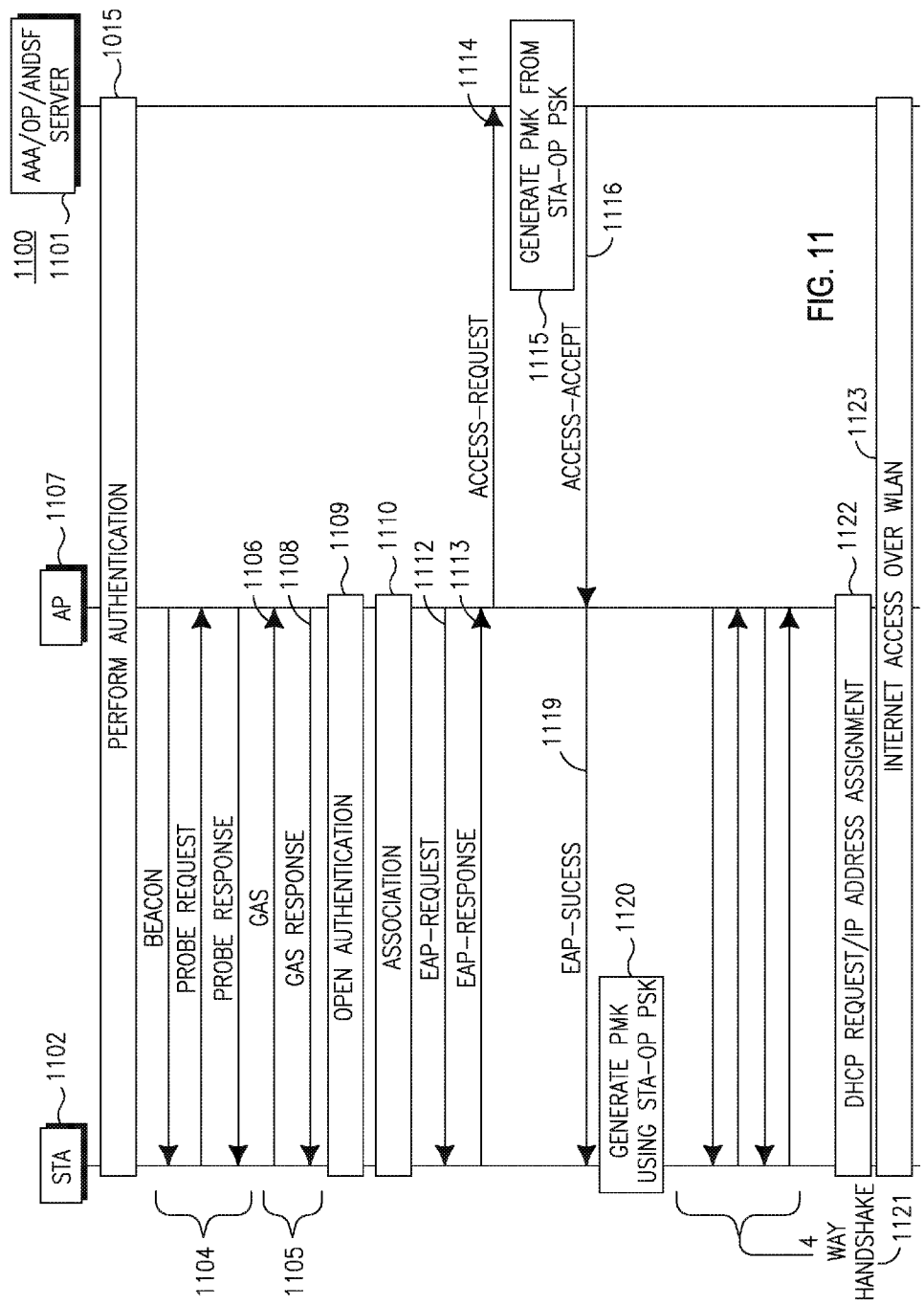
FIG. 11 is a diagram of an example method in which an AAA server may integrate OP functionality to enable seamless authentication and fast link setup.

FIG. 11 is a diagram of an example method 1100 in which the AAA server 1101 integrates OP functionality to enable seamless authentication and FILS. The example in FIG. 11 may assume that the STA 1102 and the OP unit of the AAA server 1101 have already established security association and master keys that may be leveraged for accessing the WLAN network. The STA 1102 may have successfully completed mutual authentication towards the OP over, for example, the 3GPP access network, and shared Master keys (PSK) may be established on the STA 1102 and the OP unit of the AAA server 1101. The STA 1102 may not have connectivity to an eANDSF and, therefore, may perform WLAN network discovery through other mechanisms, for example, using 802.11u.

In the example shown in FIG. 11, during a fast EAP procedure, the OP unit of the AAA server 1101 may recognize a STA identity and correlate it with an existing security association. The OP unit of the AAA server 1101 may determine that the STA 1102 is already authenticated, perform fast EAP authentication, and generate PMK based on the previously generated Master key shared with the STA 1102.

For example, the STA 1102 may have successfully completed mutual authentication 1103 towards the OP unit of the AAA server 1101 over a network that it may have been previously connected to, for example, a 3GPP access network, and shared Master keys (PSK) may be established on the STA 1102 and the OP unit of the AAA server 1101. The STA 1102 may perform passive and/or active AP discovery 1104 as described in FIG. 9. The STA 1102 may perform one or more GAS message exchanges to perform Network discovery 1105. For example, the STA 1102 may transmit a GAS message 1106 to AP 1107, and receive a GAS response message 1108 from the AP 1107 in response.

The STA 1102 may perform open authentication 1109 and associate 1110 with the selected AP 1107. Open authentication 1109 may not provide any security measures and may be skipped if an 802.1x/EAP method is used.

The AP 1107 may be referred to as the authenticator in this example, and may issue an EAP Request 1112 requesting a STA identity. The STA 1102 may return an EAP Response 1113 that may include a unique identity, for example, an international mobile subscriber Identity (IMSI) with its realm. The realm may include a hint to use SSO authentication, for example, IMSI@sso.MNO.com. The AP 1107 may transmit an access request 1114 to an AAA server 1101 using, for example, a RADIUS access request. The Access Request 1114 may include an EAP ID.

The AAA server 1101 may generate a PMK from the STA-OP PSK 1115, and transmit an Access Accept message 1116 to the AP 1107. The Access Accept message 1116 may include an EAP ID, an indication of success, and the PMK key to the AP. The AP 1107 may transmit an EAP Success message 1119 to the STA 1102. In response, the STA 1102 may generate a PMK using the STA-OP PSK 1120 and may perform a 4-way handshake protocol 1121 with the AP 1107, request IP address assignment using DHCP 1122, and access the internet over WLAN 1123, as described in FIG. 9 above.

Figure 12:
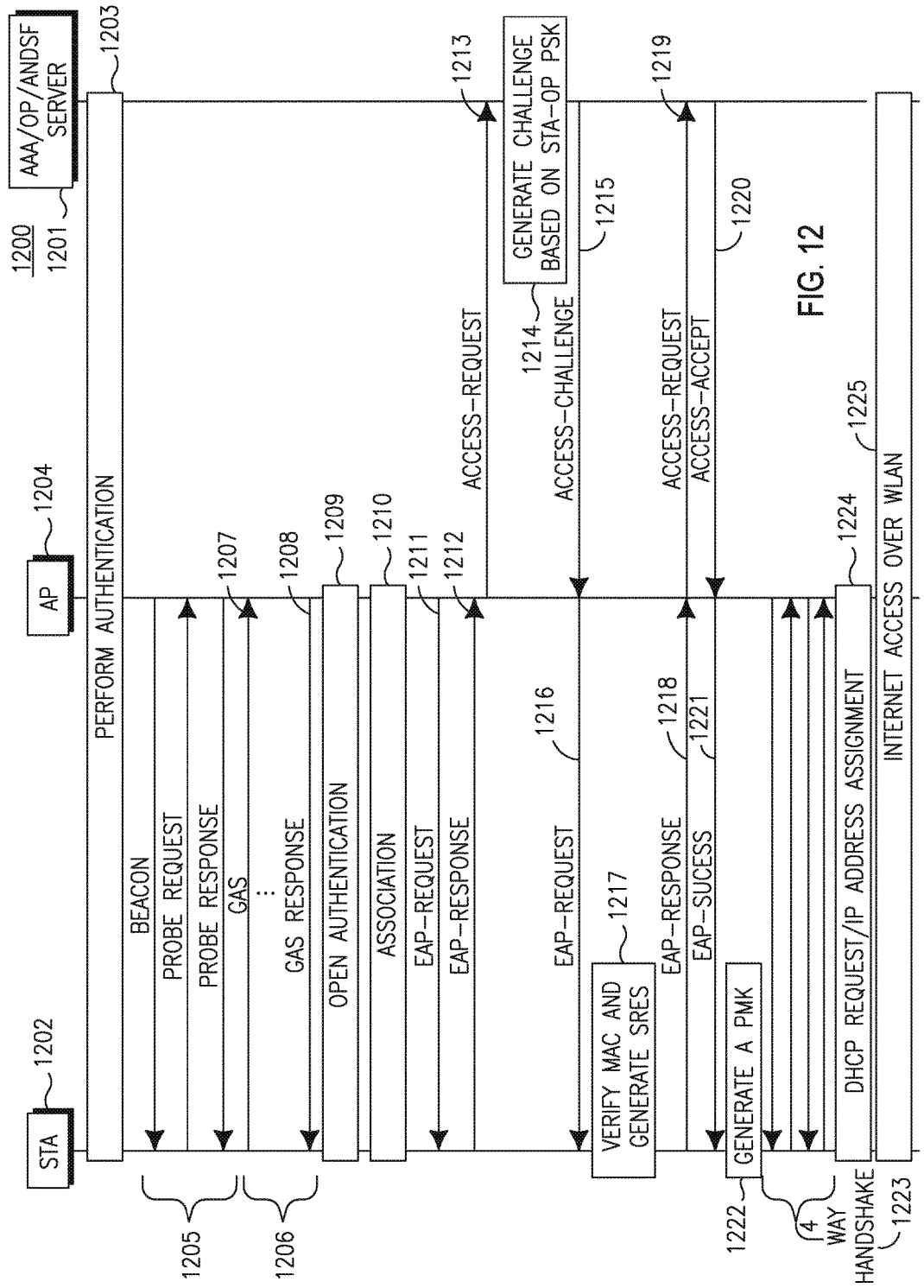
FIG. 12 is a diagram of another example method in which an AAA server may integrate OP functionality to enable seamless authentication and fast link setup.

FIG. 12 is a diagram of an example method 1200 in which a AAA server 1201 may integrate OP functionality to enable seamless authentication and FILS. This example may assume that the STA 1202 and the OP unit of the AAA server 1201 have already established security association and master keys that may be leveraged for accessing the WLAN network. The STA 1202 may have successfully completed mutual authentication 1203 towards the OP unit of the AAA server 1201 over, for example, a 3GPP access network, and shared Master keys, for example, PSK, may be established on the STA 1202 and the OP unit of the AAA server 1201. The STA 1202 may not have connectivity to an eANDSF and, therefore, may perform WLAN network discovery through other mechanisms, for example, using 802.11u.

Referring to FIG. 12, the STA 1204 may perform passive and/or active AP discovery 1205 as described in FIG. 9. The STA 1202 may perform one or more GAS message exchanges to perform Network discovery 1206. For example, the STA 1202 may transmit a GAS message 1207 to AP 1204, and receive a GAS response message 1208 from the AP 1204 in response.

The STA 1202 may perform open authentication 1209 and associate 1210 with the selected AP 1204. Open authentication 1209 may not provide any security measures and may be skipped if an 802.1x/EAP method is used.

The AP 1204 may be referred to as the authenticator in this example, and may issue an EAP Request 1211 requesting a STA identity. The STA 1202 may return an EAP Response 1212 that may include a unique identity, for example, an international mobile subscriber Identity (IMSI) with its realm. The realm may include a hint to use SSO authentication, for example, IMSI@sso.MNO.com. The AP 1204 may transmit an Access Request 1213 to the AAA server 1201 using, for example, a RADIUS access request. The Access Request 1213 may include an EAP ID.

The OP unit of the AAA server 1201 may determine that the STA 1202 needs to be re-authenticated before transmitting an Access Accept message to the AP 1204. Accordingly, one or more rounds of EAP-Challenge/Response messages may be exchanged before transmitting an EAP-Success message and keying material to the AP 1204. For example, the AAA server 1201 may generate a challenge based on a STA-OP PSK 1214 and transmit an access challenge message 1215 to AP 1204. The access challenge message 1215 may include an EAP ID and/or an EAP challenge. The AP 1204 may transmit an EAP-Request message 1215 to STA 1202 in response to the access challenge message 1215. The EAP-Request message 1216 may include an identity and/or a challenge. The STA 1202 may receive the EAP-Request message 1216, verify the MAC and generate an SRES 1217, and transmit an EAP-Response message 1218 to the AP 1204. The EAP-Response message 1218 may include an identity and/or a response to the challenge.

The AP 1204 may transmit an access request message 1219 to the AAA server 1201, and receive an access accept message 1220 from the AAA server 1201 in response. The access request message 1219 may include an EAP ID and/or a response to the challenge. The access accept message 1220 may include an EAP ID, an indication of success, and the PMK key to the AP. In response to receiving the access accept message 1220, the AP 1204 may transmit an EAP-Success message 1221 to the STA 1202. In response to receiving the EAP-Success message 1221, the STA 1202 generate a PMK 1222 using the STA-OP PSK, and may perform a 4-way handshake protocol 1223 with AP 1204, request IP address assignment using DHCP 1224, and access the internet over WLAN 1225, as described in FIG. 9 above.

Figure 13:
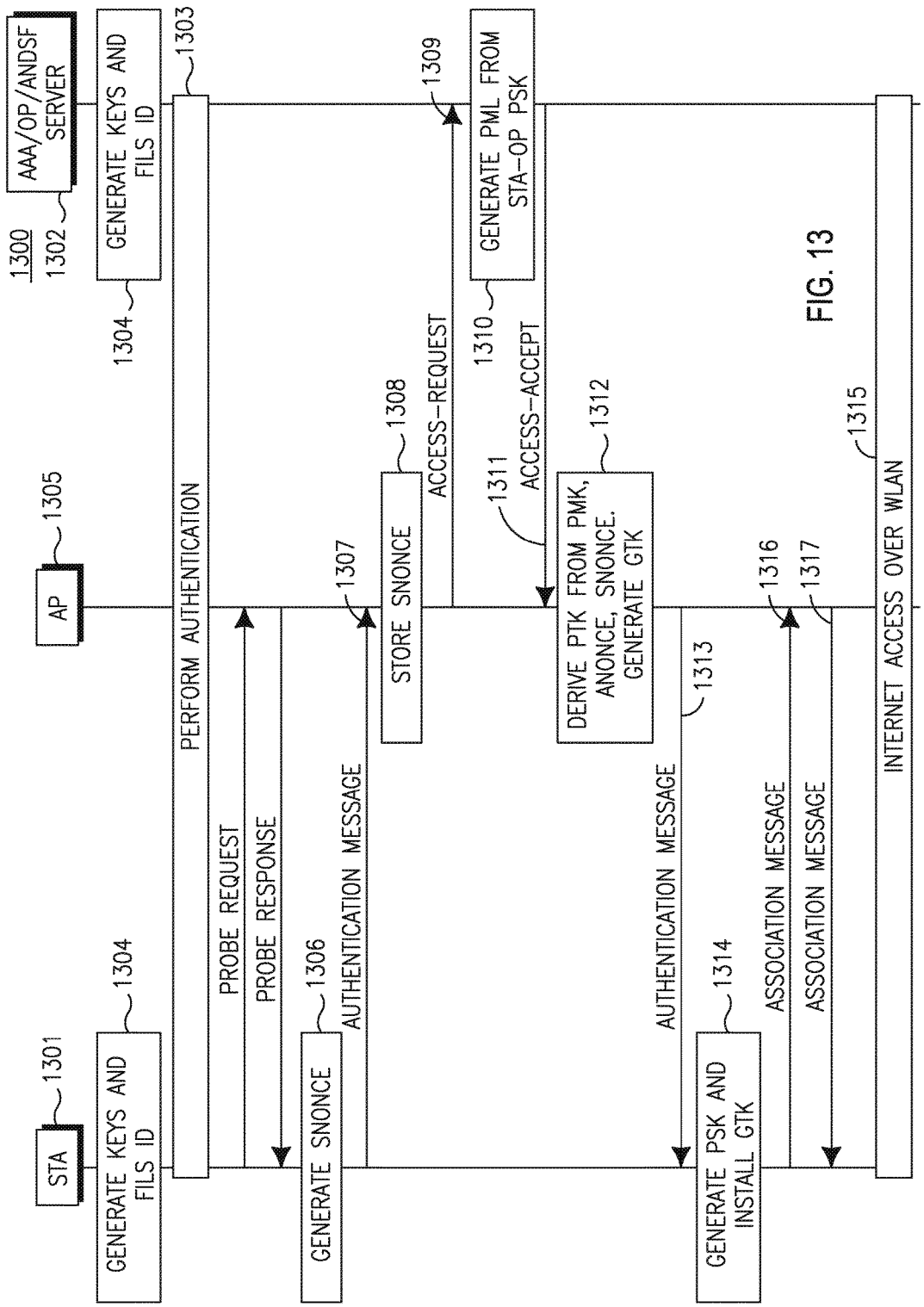
FIG. 13 is a diagram of an example method for a pre-established security association between a STA and a network to enable seamless authentication and fast initial link setup.

FIG. 13 is a diagram of an example method 1300 for a pre-established security association between a STA 1301 and a network to enable seamless authentication and fast initial link setup. In this example, Fast EAP may be encapsulated into 802.11 Authentication frames. This may assume that the STA 1301 and the network, for example an AAA server 1302 with integrated OP functionality, have already established security association and master keys that may be leveraged for secure access to the WLAN network. The STA may have successfully completed mutual authentication 1303 towards the AAA/OP over 3GPP access network and shared Master keys (PSK), and FILS Identity 1304 may have been established on both the STA 1301 and AAA server 1302.

In this example, the 802.11 Authentication frames may encapsulate Fast EAP messages between the STA 1301 and the AP 1305. In addition Snonce and Anonce may be exchanged using the Authentication frames, which may enable a 4-Way Handshake Protocol to be performed concurrently. For example, the STA 1301 may generate a Snonce 1306 and transmit an authentication message 1307 to the AP 1305. The authentication message 1307 may include an EAP Response message, and indicate a sequence number, FILS ID, Snonce, and/or an Auth-tag.

The AP 1305 may store 1308 the Snonce and transmit an access request message 1309 to the AAA server 1302. The access request message 1309 may be an EAP message, and may include a FILS ID, a sequence number (SEQ), and/or an Auth-tag.

The AAA server 1302 may use the FILS identity to look up the pre-established security context with the STA 1301. The AAA server 1302 may verify the sequence number. The server may then proceed to verify the integrity of the message using the integrity key, thereby verifying proof of possession of that key by the peer. If all verifications are successful, the AAA server 1302 may generate a PMK 1310 from a STA-OP PSK and transmit an access accept message 1311 to the AP 1305. The access accept message may include a session key, for example a PMK, an EAP-Success message, an SEQ, a FILS ID, a Channel binding information (CB-Info) field, and/or an authentication tag (Auth-tag). The Auth-tag may enable a receiver, for example a STA or an AAA server, to verify the integrity of the received message and determine its validity. The AAA server 1302 may transmit CB-Info in an EAP message (not shown) so that the STA may verify that the EAP message was received via the correct AP and not a compromised AP.

If the STA 1301 includes an optional [IP_CFG_REQ] field in the authentication message 1307, the AAA server 1302 may transmit the IP configurations to the STA 1301 in an [IP_CFG_Reply] field of the EAP-Success message. Note that the brackets may indicate optional fields.

In addition, the AAA server 1302 may transmit Channel binding information [CB-Info] in the EAP-Success message so that the STA 1301 may verify that the EAP message was received via the correct AP and not a compromised one.

In response to receiving the access accept message 1311, the AP 1305 may derive a PTK 1312 from the PMK, Anonce, and/or Snonce, and generate a GTK. The AP 1305 may transmit an authentication message 1313 to the STA 1301. The authentication message 1313 may include, for example, an EAP Success message that may indicate an SEQ, FILS ID, CB-Info, Anonce, and/or an Auth-tag.

In response to receiving the authentication message 1313, the STA 1301 may derive a PTK 1314 and install the GTK. At the end of successful authentication, the STA 1301 and the AP 1305 may have the (PTG, GTK) Keys ready to protect data exchanged between STA 1301 and the AP 1305 over the 802.11 radio 1315.

In the case where the STA 1301 may not have the necessary IP configurations, the STA 1301 may use, for example, an 802.11 Association frame exchange to provide the necessary IP address configurations for the FILS authenticated STA such that it may be ready to launch applications, for example, internet browsing, or switch ongoing sessions from one network, for example, 3GPP, to the WLAN network securely. For example, the STA 1301 may transmit an association message 1316 to the AP 1305, and receive an association message 1317 in response from the AP 1305. The association message 1316 may include an [IP-CFG-REQ] field, and the association message 1317 may include an [IP-CFG-Reply] field.

Figure 14:
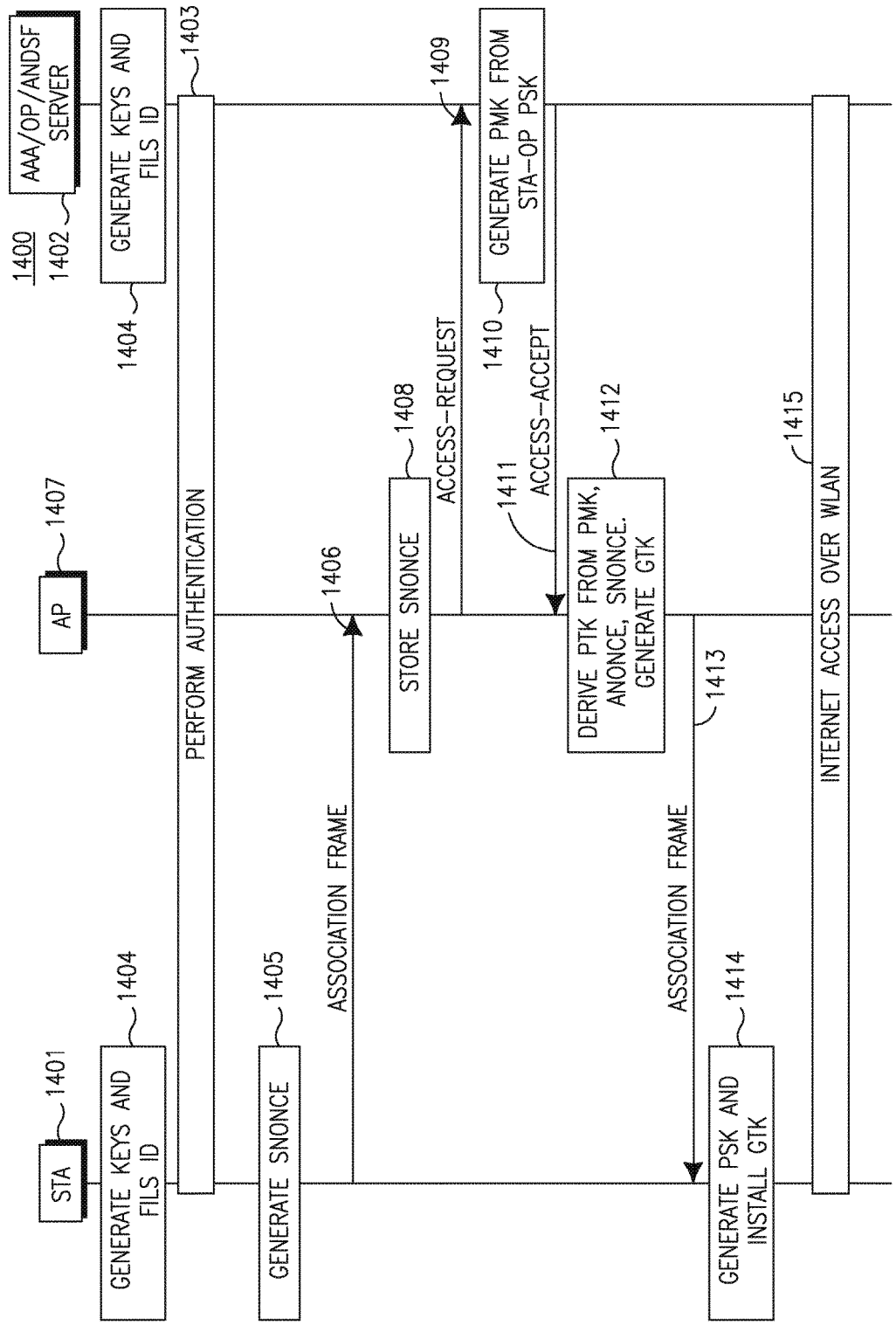
FIG. 14 is a diagram of another example method for a pre-established security association between a STA and a network to enable seamless authentication and fast initial link setup.

FIG. 14 is a diagram of an example method 1400 for a pre-established security association between a STA 1401 and a network, for example, an AAA server 1402 to enable seamless authentication and fast initial link setup. In this example, Fast EAP may be encapsulated into 802.11 Association frames. The AAA server 1402 may be configured to perform OP functions.

This example may assume that the STA and the AAA server 1402 have already established security association and master keys that may be leveraged for secure access to the WLAN network. It may be assumed that the STA 1401 successfully completed mutual authentication 1403 towards the OP unit of the AAA server 1402 over a 3GPP access network and that shared Master keys (PSK) and FILS Identity 1404 are established on both the STA 1401 and AAA server 1402.

In this example, the STA 1401 may generate an Snonce 1405, and transmit an association frame 1406 to the AP 1407. The association frame 1406 may include an EAP message, and indicate an SEQ, FILS ID, [IP-CFG-REQ], Snonce 1405, and/or an Auth-tag. The AP 1407 may receive the association frame 1406 and store 1408 the Snonce 1405. The AP 1407 may transmit an access request frame 1409 to the AAA server 1402. The access request frame 1409 may include an EAP-Response message, and indicate an SEQ, FILS ID, [IP-CFG-REQ], and/or Auth-tag.

In response to receiving the access request frame 1409, the AAA server 1402 may generate 1410 a PMK from the STA-OP PSK. The AAA server 1402 may transmit an access accept frame 1411 to the AP 1407. The access accept frame 1411 may include a PMK and/or an EAP-Success message, and indicate an SEQ, FILS ID, [IP-CFG-Reply], [CB-Info], and/or an Auth-tag.

In response to receiving the access accept frame 1411, the AP 1407 may derive 1412 a PTK from the PMK, Anonce, and/or Snonce, and generate a GTK. The AP 1407 may transmit an association frame 1413 to the STA 1401. The association frame 1413 may include an EAP-Success message, and indicate an SEQ, FILS ID, [CB-Info], Anonce, [IP-CFG-Reply], and/or an Auth-tag. The STA 1401 may derive 1414 a PTK and install the GTK and access the internet over the WLAN 1415.

In this example, the 802.11 Association frames may include at least the following: (1) Fast EAP messages between the STA and the AP; (2) Snonce and Anonce needed to complete the 4-Way Handshake Protocol concurrently; (3) [IP-CFG-REQ] from the STA to the AP and [IP-CFG-Reply] from the AP to the STA for concurrent IP address assignment. At the end of association, the FILS authenticated STA may have the necessary IP address configurations to access the WLAN network securely.

Figure 15:
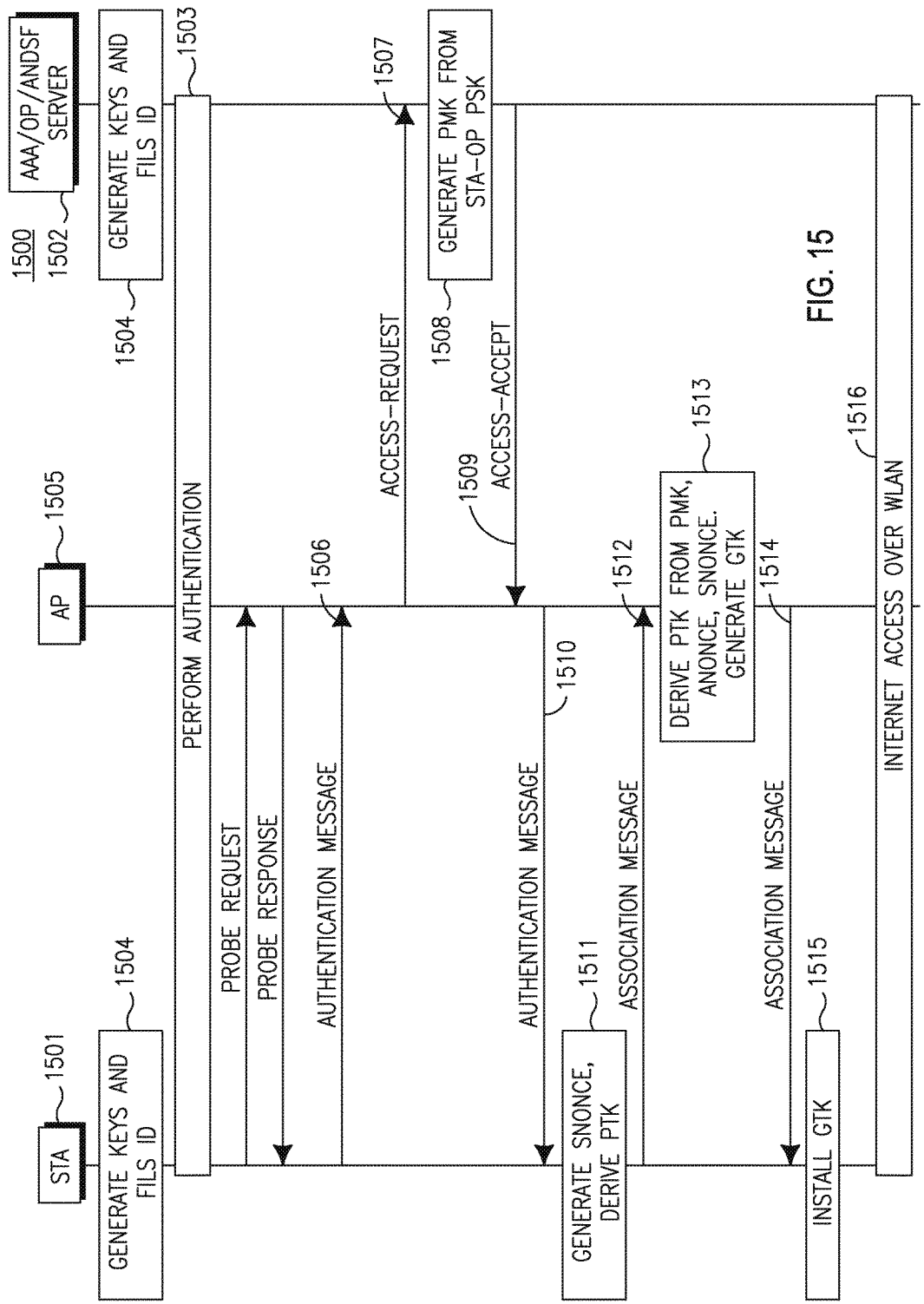
FIG. 15 is a diagram of another example method for a pre-established security association between a STA and a network to enable seamless authentication and fast initial link setup.

FIG. 15. is a diagram of an example method 1500 for a pre-established security association between a STA 1501 and a network, for example an AAA server 1502, to enable seamless authentication and fast link setup. This example may be based on a Non-EAP FILS Authentication. The AAA server 1502 may be configured to perform OP and/or eANDSF functions.

This example may assume that the STA 1501 and the AAA server 1502 have already established security association and master keys that may be leveraged for secure access to the WLAN network. It may be assumed that the STA 1501 successfully completed mutual authentication 1503 towards the OP unit of the AAA server 1502 over, for example, a 3GPP access network, and that a shared Master keys (PSK) and FILS Identity are established 1504 on both the STA 1501 and AAA server 1502.

In this example, the 802.11 Authentication frames carry non-EAP Authentication messages between the STA 1501 and the AP 1505. In addition Anonce may be transmitted from the AP 1505 to the STA 1501 using the Authentication frames which may enable the STA 1501 to derive PTK.

The 802.11 Association frames may carry a Snonce from the STA 1501 to the AP 1505 such that the AP 1505 may derive a PTK on its side. In addition, the Association frames may carry an optional IP configuration request [IP-CFG-REQ] from the STA 1501 to the AP 1505 and [IP-CFG-Reply] from the AP 1505 to the STA 1501. At the end of association, the FILS authenticated STA has the necessary IP address configurations to access the WLAN network securely.

For example, the STA 1501 may transmit an authentication message 1506 to the AP 1505. The authentication message 1506 may include an SEQ, FILS ID, and/or an Auth-tag. In response to receiving the authentication message 1506, the AP 1505 may transmit an access request message 1507 to the AAA server 1502. The access request message 1507 may include an SEQ, FILS ID, and/or an Auth-tag. The AAA server may generate 1508 a PMK from the STA-OP PSK, and transmit an access accept message 1509 to the AP 1505. The access accept message may include a PMK, SEQ, FILS ID, [CB-Info], and/or an Auth-tag.

In response to receiving the access accept message 1509, the AP 1505 may transmit an authentication message 1510 to the STA 1501. The authentication message 1510 may include an SEQ, [CB-Info], Anonce, and/or an Auth-tag. The STA 1501 may generate 1511 an Snonce, derive a PTK, and transmit an association message 1512 to the AP 1505. The association message 1512 may include an Snonce, [IP-CFG-REQ], and/or an Auth-tag.

The AP 1505 may derive 1513 a PTK from the PMK, Anonce, and Snonce, and generate a GTK. The AP 1505 may transmit an association message 1514 to the STA 1501. The association message 1514 may include a GTK, [IP-CFG-Reply], and/or an Auth-tag. In response to receiving the association message 1514, the STA 1501 may install the GTK 1515, and access the internet securely over the WLAN 1516.

At the end of the AP discovery phase, ALS capable STAs and APs may negotiate ALS post-AP-discovery procedures based on the availability and amount of information the STAs and APs have pre-acquired about each other. This pre-acquired information may include, for example, one or more of network services information, TSF Information, 802.11 authentication and association information, EAP/802.1x authentication and security information, and IP address assignment information. Based on this available pre-acquired information, the STA or the AP may initiate negotiation of customized post-AP-discovery procedures.

Examples of signaling used for the Post-AP-Discovery procedure negotiations are shown in Table 3, where potential actions in each phase of the Post-AP-Discovery linkset up process are listed and expressed by a binary sequence. A sequence of numbers beginning with "0b" in Table 3 may indicate that the numbers after "0b" is an expression in the binary format.

TABLE 3

Examples of Negotiation Signaling

| Phase | # bits | Details |
|---|---|---|
| Network Discovery | 3 | 0b000: 802.11u<br>0b001: 802.11u-plus<br>0b010-0b110: reserved |

TABLE 3-continued

Examples of Negotiation Signaling

| Phase | # bits | Details |
|---|---|---|
| | | 0b111: skip Network Discovery Phase |
| Additional TSF | 1 | 0b0: unchanged<br>0b1: skip Additional TSF |
| 802.11 Authentication | 2 | 0b00: unchanged<br>0b01-0b10: Reserved<br>0b11: skip 802.11 Authentication Phase |
| 802.11 Association | 2 | 0b00: unchanged<br>0b01: updated to carry more information elements;<br>0b10: reserved<br>0b11: skip 802.11 Association Phase |
| EAP/802.1x Authentication & Security | 4 | 0b0000: unchanged<br>0b0001: use fast EAP authentication<br>0b0010: use Fast EAP authentication and fast key provisioning<br>0b0011: Fast network discovery and fast EAP authentication;<br>0b0100: Fast network discovery, fast EAP authentication, and fast key provisioning.<br>0b0101-0b1110: reserved<br>0b1111: skip EAP/802.1x Authentication & Security Phase |
| IP Address Assignment | 3 | 0b000: unchanged;<br>0b001: do it in Layer-2 messages,<br>0b010-0b110: reserved<br>0b111: skip IP address assignment Phase |

An implementation of post-AP-discovery negotiation signaling may be multi-fold. For example, post-AP-discovery negotiation may be implemented using the FILS management action frame described above, where the negotiation signaling code for each phase of the post-AP discovery may be located in a corresponding field in the FILS management action frame. In another example, the negotiation signaling codes may be implemented as a bit map in IEs of AP discovery messages, for example, in the I-Know-You IE and/or I-know-you-response IEs. In another example, the negotiation signaling codes may be implemented in IEs included in other management and control frames, such as beacon, probe requests and probe responses.

Using the example encoding in Table 3, a 15-bit ALS information field may be included by the STA or the AP to express its most optimized post-AP-discovery link setup procedure. The ALS information field may be segmented into different sizes of segments, each segment corresponding to a post-AP-discovery link setup phase. The bit order in the identifier may be the same order of the functional phases illustrated in Table 3, for example, bits 14 and 13 corresponding to network a discovery phase.

If, for example, the AP has pre-acquired identity information of a candidate STA, such as the MAC address and/or service need information, the AP may determine that the network discovery, additional TSF, and 802.11 authentication phases may be skipped and the link setup procedure should go through the 802.11 association, EAP authentication, and/or DHCP-based IP address assignment phases when the AP receives a frame from the STA, for example, a probe request frame. The AP may, therefore, transmit a probe response frame to the STA with an I-know-you IE including a 15-bit Post-AP-discovery procedure code of "0b111 1110 0000 0000". If the STA receives such a post-AP-discovery procedure code, the STA may either transmit an I-know-you-response IE with the same or revised code in a management frame to confirm or revise the post-AP-discovery procedure, or it may implicitly accept it by directly proceeding to the next phase as suggested by the code, for example, 802.11 association. In this way, the AP may initiate the link setup optimizations by using its pre-acquired knowledge about the STA.

In another example, when a STA includes the ALS Information Field "0b111 111 01 0010 001" for its ALS Post-AP-Discovery procedure in its probe request frame to a preferred AP, the STA may be indicating to the AP one or more of the following: the most optimized ALS post-AP-discovery procedure with this particular AP may include the phases of network discovery, and additional TSF and 802.11 authentication may be skipped; a modified 802.11 association phase may be used; a fast EAP authentication and fast key provisioning scheme may be used; and/or an optimized IP address assignment may be used, for example, by carrying one or more DHCP messages in one or more Layer-2 messages. The AP receiving a probe request that indicates that the STA is a STA with pre-acquired information, may transmit a probe response frame using a similar sequence depending on the amount of information the AP has pre-acquired about the STA. The STA receiving the probe request may respond by transmitting a FILS management action frame to confirm the agreed optimized and customized ALS post-AP-discovery procedure.

When an AP and a STA negotiate the post-AP-discovery procedure, if for one or more phases of the link setup processes of the AP and STA have different requirements, then the stricter requirement may prevail. An example of the different requirements may be where the STA may request to skip the network discovery phase while the AP may request an 802.11u network discovery phase. In this example, the STA may agree to an 802.11u network discovery phase at the request of the AP. In addition, the final agreed upon optimized ALS post-AP-discovery procedure may be positively confirmed for the correct functioning of the ALS. Such a confirmation may be achieved by transmitting a FILS management action frame including the agreed ALS post-AP-discovery procedure and an ALS information field indicating the agreed upon ALS post-AP-discovery procedure in a unicast frame, such as a probe request frame, a probe response frame, an association request frame, etc., to the corresponding STA or AP.

Another example method may include using pre-acquired system configuration knowledge. The system configuration for this example may be referred to as a set of system parameters that are either static or semi-static for a specific system deployment and operational mode. Such system parameters may also be referred to as system configuration parameters, and the "system" in this context may refer to the IEEE 802.11-based Wireless LAN systems.

The system configuration may be pre-acquired by the STA prior to initiating a link setup process with a BSS/AP, and it may be used to accelerate the initial link setup process.

System configuration parameter sets may be defined. For example, to specify the operational mode of a Wireless LAN system, the following three different configurations may be defined and used: (1) BSS/AP configuration, also referred to as the BSS configuration or AP configuration; (2) Access Network configuration; and (3) Combined AP/Network configuration also referred to as the AP/Network configuration.

Each of the above configurations may contain a set of system parameters that specifies the corresponding system operational settings. The AP configuration parameter set may include the BSS/AP operational parameters/descriptors that are static or semi-static over time with regard to value changes.

In order to use system configuration information as pre-acquired knowledge to accelerate the link setup process, the following basic criteria may be applied to select the AP configuration parameters: (a) the parameters that may be used to start a BSS/AP operation, for example, the parameters used in the MLME_START.request primitives in 802.11; (b) the parameters that may be used to specify BSS/AP operation settings that may be communicated between an AP and STAs, for example, in a Beacon frame or Probe Response frame, etc.; (c) the parameters that may not dynamically change the values overtime, for example, keeping the same values for hours, days, even months; and/or (d) the parameters that may be relevant for link setup.

Based on the basic selection criteria, Table 4 below provides an example of an infrastructure BSS/AP configuration parameter set.

TABLE 4

An Example of Infrastructure BSS/AP Configuration Parameter Set

| Parameter Name | present indicator | Value Valid Value Range | Description | Additional Notes |
|---|---|---|---|---|
| BSSID | Must present | 6-byte MAC address of the AP STA | 6-byte MAC address of the AP STA | in MAC frame header sent by the AP STA |
| SSID | Must present | Octet string, 0-32 octets | The SSID of the BSS. | in Beacon/Probe Response/FD frame |
| SSIDEncoding | Present/Not-Present | Enumeration: UNSPECIFIED, Universal Character Set (UCS) Transformation Format 8 (UTF8). This value may be an 8 bit value. | The encoding used for the SSID | in the exended capability IE in Beacon/Probe Response; |
| BSSType | Present/Not-Present | Enumeration: INFRASTRUCTURE, INDEPENDENT, | The type of the BSS. | in the capability IE in Beacon/ |

TABLE 4-continued

An Example of Infrastructure BSS/AP Configuration Parameter Set

| Parameter Name | present indicator | Valid Value Range | Description | Additional Notes |
|---|---|---|---|---|
| | | MESH | | Probe Response; |
| BeaconPeriod | Present/ Not-Present | Integer: >=1 | The Beacon period (in Time Unit (TU)) of the BSS. | Beacon Interval in Beacon/Probe Response. |
| Contention Free (CF) parameter set | Present/ Not-Present | The CF Parameter Set element contains the set of parameters necessary to support the point coordination function (PCF). The Information field contains the CFPCount, CFPPeriod, CFPMaxDuration, and CFPDurRemaining fields. The total length of the Information field is 6 octets. | The parameter set for CF periods, if the BSS supports CF mode. | in Beacon/ Probe Response |
| PHY parameter set | Present/ Not-Present | The Information field may contain Dwell Time, Hop Set, Hop Pattern, and Hop Index parameters. The total length of the Information field may be 5 octets. Alternatively, the Information field may contain a single parameter containing the dot11CurrentChannel, and may be 1 octet in length. | The parameter sets relevant to the PHY | in Beacon/ Probe Response |
| CapabilityInformation | Present/ Not-Present | The length of the Capability Information field may be 2 octets. | The capabilities to be advertised for the BSS. | in Beacon/ Probe Response |
| BSSBasicRateSet | Present/ Not-Present | Set of Integers: 1-127 inclusive (for each integer in the set) | The set of data rates that shall be supported by all STAs to join this BSS. The STA that is creating the BSS shall be able to receive and transmit at each of the data rates listed | in the Supported Rates IE in Beacon/Probe Response |

TABLE 4-continued

An Example of Infrastructure BSS/AP Configuration Parameter Set

| Parameter Name | present indicator | Value Valid Value Range | Description | Additional Notes |
|---|---|---|---|---|
| OperationalRateSet | Present/ Not-Present | Set of Integers: 1-127 inclusive (for each integer in the set) | The set of data rates that the STA desires to use for communication within the BSS. The STA shall be able to receive at each of the data rates listed in the set. This set is a superset of the rates contained in the BSSBasicRateSet parameter. | in the Supported Rates IE, extended supported Rates IE, and/or ERP IE in Beacon/ Probe Response |
| Country | Present/ Not-Present | The length may be 6 to 7 octets. | The information required to identify the regulatory domain in which the STA is located and to configure its PHY for operation in that regulatory domain. | in Beacon/ Probe Response |
| EDCAParameterSet | Present/ Not-Present | The length may be 20 octets. | The initial enhanced distributed channel access (EDCA) parameter set values to be used in the BSS. | in Beacon/ Probe Response |
| DSERegisteredLocation | Present/ Not-Present | The length may be 22 octets. | The information for the data service element (DSE) Registered Location element. | in Beacon/ Probe Response |
| High Throughput (HT) Capabilities | Present/ Not-Present | The length may be 28 octets. | The HT capabilities to be advertised for the BSS. | in Beacon/ Probe Response |
| HT Operation | Present/ Not-Present | The length may be 24 octets. | The additional HT capabilities to be advertised for the BSS. | in Beacon/ Probe Response |
| BSSMembershipSelectorSet | Present/ Not-Present | set of integers: A value from Table 8-55 for each member of the set. | The BSS membership selectors that represent the set of features that shall be supported by all STAs to join this BSS. The STA that creating the BSS shall be able to support each of the features represented by the set. | included as one value setting in Supported rate IE, in Beacon/Probe Response |
| BSSBasicMCSSet | Present/ Not-Present | set of integers: Each representing an MAC index value in the range 0 to 76. | The set of modulation and coding scheme (MCS) values that shall be supported by all HT STAs to join this BSS. The STA that is creating the BSS shall be able to receive and transmit at each of the MCS values listed in the set. | included as one subfield in the HT operation IE in Beacon/ Probe Response |
| HTOperationalMCSSet | Present/ Not-Present | set of integers: Each representing an MAC index value in the range 0 to 76. | The set of MCS values that the STA desires to use for communication within the BSS. The STA shall be able to receive at each of the data rates listed in the set. This set is a superset of the MCS values contained in the BSSBasicMCSSet parameter. | included as one subfield in the HT capability IE in Beacon/ Probe Response. |
| Extended Capabilities | Present/ Not-Present | The length may be variable. | Specifies the parameters within the Extended Capabilities element that are supported by the MAC entity. | in Beacon/ Probe Response |
| 20/40 BSS Coexistence | Present/ Not-Present | The length may be 3 octets. | Specifies the parameters within the 20/40 BSS Coexistence element that are indicated by the MAC entity. | in Beacon/ Probe Response |
| Overlapping BSS Scan Parameters | Present/ Not-Present | The length may be 16 octets. | Specifies the parameters within the Overlapping BSS Scan Parameters element that are indicated by the MAC entity. | in Beacon/ Probe Response |
| MultipleBSSID | Present/ Not-Present | The length may be variable. | Specify the multiple BSSID information when the AP is a member of a Multiple BSSID Set with two or more | in Beacon/ Probe Response |

TABLE 4-continued

An Example of Infrastructure BSS/AP Configuration Parameter Set

| Parameter Name | Value present indicator | Valid Value Range | Description | Additional Notes |
|---|---|---|---|---|
| | | | members. | |
| Interworking Info | Present/ Not-Present | The length may be 3, 5, 9, or 11 octets. | Specifies the Interworking capabilities of STA. | in Beacon/ Probe Response |
| Advertisment ProtocolInfo | Present/ Not-Present | 0-255 | Identifies zero or more Advertisement Protocols and advertisement control to be used in the BSSs. | in Beacon/ Probe Response |
| RoamingConsortiumInfo | Present/ Not-Present | The length may be variable. | Specifies identifying information for subscription service provider (SSP)s whose security credentials can be used to authenticate with the AP. | in Beacon/ Probe Response |
| Power Constraint | Present/ Not-Present | The length may be 3 octets. | contains the information necessary to allow a STA to determine the local maximum transmit power in the current channel. | in Beacon/ Probe Response |
| RSN | Present/ Not-Present | The length may be up to 255 octets. | contains authentication and pairwise cipher suite selectors, a single group data cipher suite selector, an RSN Capabilities field, the PMK identifier (PMKID) count, a PMKID list, and a single group management cipher suite selector. | in Beacon/ Probe Response |
| AP Channel Report | Present/ Not-Present | The length may be variable. | contains a list of channels where a STA is likely to find an AP. | in Beacon/ Probe Response |
| Supported Regulatory Classes | Present/ Not-Present | The length may be between 2 and 253 octets. | advertise the operating classes that it is capable of operating in the country. | in Beacon/ Probe Response |
| VendorSpecificInfo | Present/ Not-Present | The length may be variable. | containing vendor-specific information. | in Beacon/ Probe Response |

The example BSS/AP configuration parameter set above is per BSS/AP that is identified by the BSSID, for example the 6-byte MAC address of the AP.

As shown in Table 4, each parameter in the AP configuration parameter set has a present-indicator to indicate whether or not the value of the parameter is present in a specific configuration instance. A configuration instance may be referred to as a configuration indicator. This may allow a subset of the parameters in the configuration set to specify a specific BSS/AP operation mode with the use of a specific PHY mode and/or the selection of certain optional system features and functionalities, for example, QoS support, Interworking services, etc.

The Access Network configuration parameter set may include the static or semi-static operational parameters or descriptors of the access network behind the BSS/AP that may be relevant to link setup of STAs. Similarly, in order to use the access network configuration information as the pre-acquired knowledge to accelerate the link setup process, the following basic criteria may be applied to select the access network configuration parameters: (a) the parameters that may be used to specify the access network services, capabilities, attributes, and/or functionalities, for example, those parameters used in the access network discovery messages, such as access network query protocol (ANQP/ GAS; (b) the parameters that may not dynamically change the values overtime, for example, keeping the same values for hours, days, even months; and/or (c) the parameters that may be relevant for link setup.

Based on the above selection criteria, Table 5 below provides an example access network configuration parameter set.

TABLE 5

An Example of Access Network Configuration Parameter Set

| Parameter Name | Present Indicator | Description |
|---|---|---|
| Venue Name information | Present/ not-present | Provides zero or more venue names associated with the BSS. |
| Emergency Call Number information | Present/ not-present | provides a list of emergency phone numbers to an emergency responder, such as directed by a public safety answering point (PSAP), that is used in the geographic location of the STA. |
| Network Authentication Type | Present/ not-present | provides a list of authentication types. |
| Roaming Consortium | Present/ not-present | provides a list of information about the Roaming Consortium and/or SSPs whose networks are accessible via this |

TABLE 5-continued

An Example of Access Network Configuration Parameter Set

| Parameter Name | Present Indicator | Description |
| --- | --- | --- |
| IP Address Type Availability | Present/ not-present | AP. provides STA with the information about the availability of IP address version and type that could be allocated to the STA after successful association. |
| NAI Realm | Present/ not-present | provides a list of network access identifier (NAI) realms corresponding to SSPs or other entities whose networks or services are accessible via this AP; optionally included for each NAI realm is a list of one or more EAP Method subfields, which that NAI realm uses for authentication. |
| 3GPP Cellular Network | Present/ not-present | contains cellular information such as network advertisement information e.g., network codes and country codes to assist a 3GPP non-AP STA in selecting an AP to access 3GPP networks. |
| AP Geospatial Location | Present/ not-present | provides the AP's location in LCI (Location Configuration Information) format, which includes Latitude, Longitude, Altitude, and optional Azimuth information. |
| AP Civic Location | Present/ not-present | provides the AP's location in Civic format. |
| AP Location Public Identifier URI | Present/ not-present | provides an indirect reference to the location information for the AP. |
| Domain Name | Present/ not-present | provides a list of one or more domain names of the entity operating the IEEE 802.11 access network. |
| Emergency Alert Identifier URI | Present/ not-present | provides a Uniform Resource Identifier (URI) for EAS message retrieval. |
| Tunneled Direct Link Setup (TDLS) capability | Present/ not-present | Contains the information to be used by a STA to discover the TDLS capabilities of a peer STA. |
| Emergency NAI | Present/ not-present | contains an emergency string, which is available for use by a STA as its identity to indicate emergency access request. |
| Neighbor Report | Present/ not-present | provides zero or more neighbor reports about neighboring APs. |
| vendor-specific | Present/ not-present | Contains vendor specific information about the access network. |

Similarly, the above access network configuration parameter set may be per BSS/AP, where the access network may be the network that the STA may connect to through the Wireless LAN of the BSS/AP. Also, as shown in Table 5, for each parameter in the access network configuration parameter set, a present-indicator may be used to indicate whether or not the value of the parameter is present in a specific configuration instance, such that a subset of configuration parameters may be allowed to specify a specific network operation with the selected optional features and functionalities, for example, emergency alert service, etc.

As an alternative to defining separate AP and network configuration parameter sets, a combined single AP/Network configuration parameter set may be defined to specify the operation settings and services of both the AP and access network. The combined single AP/Network configuration parameter may contain the operational parameters/descriptors for both the BSS/AP and the access network.

The selection criteria of a combined AP/Network configuration parameter set may be a combination of the AP configuration parameter selection criteria and the access network configuration selection criteria. In addition, the two parameter sets in Table 4 and Table 5 may be combined to provide an example of a combined AP/network configuration parameter set.

A system configuration instance with a configuration change count may be identified. A system configuration instance may refer to a configuration parameter set with specific values assigned to each of the configuration parameters. The configuration parameters may be used to specify a corresponding system operational mode. If a configuration parameter set may be defined for a system with optional features or functionalities, and a configuration instance may include a subset of configuration parameters with valid values, while the remaining parameters may be marked as "not-present."

Any changes to a configuration instance may result in a new configuration instance, for example, a parameter value change, or a "not-present" parameter changed to "present" with a valid value assigned, or a "present" parameter changed to "not-present," etc. A configuration instance may be identified by its version number, also referred to as a Configuration Change Count (CCC), or a Configuration Sequence Number (CSN). The CCC may be an integer variable whose value may change every time a configuration instance changes. The CCC may be changed based on a pre-defined function. One example may be that the CCC increments by 1 every time a configuration instance changes and wraps around to 0 once reaching its maximum value.

A BSS/AP configuration may be defined per BSS/AP, which may be identified by the BSSID, for example, the MAC address of the AP. An AP Configuration Change Count (AP-CCC) may be used to identify an instance of AP configuration. Accordingly, a combination of BSSID, configuration type, and/or AP-CCC, for example, may be used to identify a configuration instance of the given AP, where the configuration type may indicate a specific configuration among the multiple configurations that may be defined and used, for example, BSS/AP configuration, access network configuration, etc.

Similarly, an integer variable, such as an Access Network Configuration Change Count (AN-CCC), may be used to identify the version number of an Access Network configuration instance. A combination of BSSID, configuration type, and/or AN-CCC, may be used to identify a configuration instance of the access network through an AP.

If a combined AP/Network configuration is used, then an integer variable, such as an AP/Access Network Configuration Change Count (AP/AN-CCC), may be used to identify the version number of a combined configuration instance. For example, a combination of BSSID, configuration type, and/or AP/AN-CCC, may be used to identify a configuration instance of an AP and the access network through the AP.

System information communication may be performed with pre-defined system configuration parameter sets. In Wireless LAN systems, the system information, for example, the BSS/AP operational parameters, access network functionalities, and/or attributes, etc., may be communicated to STAs for initial link setup and for link resumption when returning from power saving modes. The system configuration parameter sets may be defined to improve the efficiency of the system information communication between AP/Network and the STAs.

When system configurations are used to facilitate efficient system communications, the definitions of the system configuration parameter sets may be known by the AP/Network and STAs. One method to meet such a requirement may be to standardize the definitions of the configuration parameter sets through Standard Bodies, for example, IEEE 802. Alternatively, the definitions of the system configuration parameter sets may be communicated first between the AP/Network and the STAs through the wireless link and/or wired links, before the configuration may be used.

Pre-defined system configuration parameter sets may be used at the AP/Network and STAs. The following examples summarize how the AP/Network may support the use of pre-defined system parameter sets to communicate the system information with STAs.

In a first example, for each defined/used system configuration parameter set, the AP may maintain the configuration instance and its corresponding CCC, for example, AP-CCC, AN-CCC, and/or AP/AN-CCC, including updating the Configuration Change Count every time the configuration instance changes.

In a second example, the AP may provide AP system information based on a pre-defined BSS/AP configuration parameter set. This example may include providing a full BSS/AP configuration instance with its corresponding AP-CCC, for example, in a Beacon frame and/or Probe Response frame. Alternatively, the AP may provide AP system information through AP-CCC only, for example, in a FILS Discovery Frame, Short Beacon frame, etc.

In a third example, the AP may provide access network system information based on a pre-defined Access Network configuration parameter set. For example, the AP may provide a full access network configuration instance with its corresponding AN-CCC, for example, in the GAS/ANQP frames. Alternatively, the AP may provide access network information through AN-CCC only, for example, in a Beacon, Probe Response, FILS Discovery, and/or Short Beacon frames.

In a fourth example, the AP may provide AP/Network system information based on a pre-defined combined AP/Network configuration parameter set. For example, the AP may provide a full AP/network configuration instance with its corresponding AP/AN-CCC, for example, in a Beacon frame, Probe Response frame, and/or GAP/ANQP frames. Alternatively, the AP may provide AP/network information through an AP/AN-CCC only, for example, in a FILS Discovery Frame, Short Beacon frame, etc.

Figure 16:
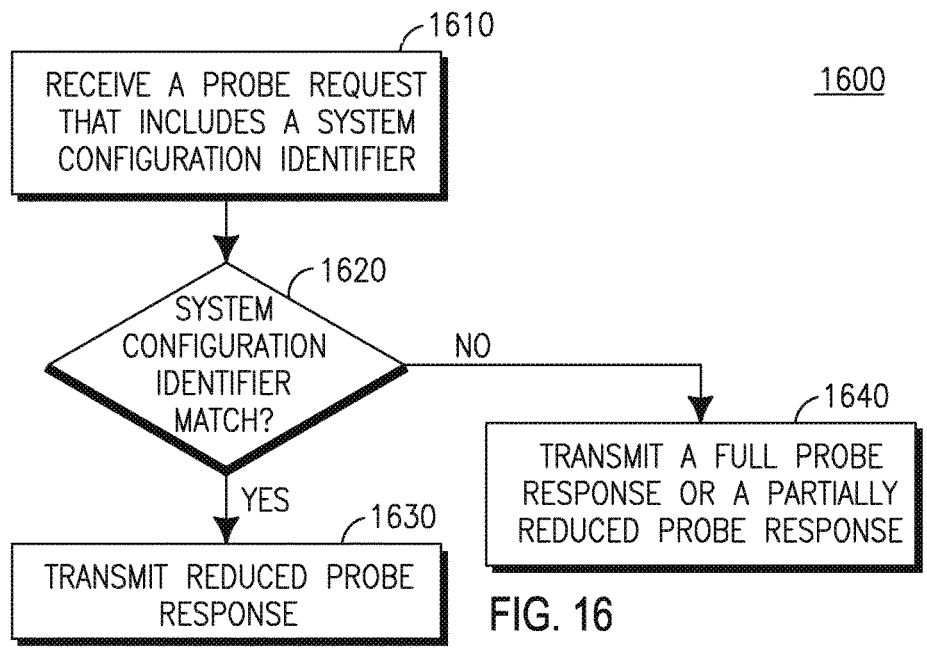
FIG. 16 is a diagram of an example method for supporting the use of pre-defined system parameter sets.

FIG. 16 is a diagram of an example method 1600 for supporting the use of pre-defined system parameter sets. Referring to FIG. 16, an AP may receive 1610 a probe request that includes a system configuration identifier, for example, a combination of BSSID, configuration type, and/or CCC that may match what the AP has. If the received system configuration identifier matches 1620 a system configuration identifier of the AP, the AP may transmit 1630 a Reduced Probe Response. A Reduced Probe Response may refer to a Probe Response frame in which a set of configuration parameters may not each be individually presented in the response frame. Instead, the same CCC value as in the Probe Request frame may be used to represent the configuration parameter set, indicating that the Probe Request transmitter STA has the valid configuration instance. If the received system configuration identifier does not match 1620 a system configuration identifier of the AP, the AP may transmit 1640 a full Probe Response with an updated set of configuration parameter values and corresponding configuration instance identifiers, or transmit a Partially-Reduced Probe Response, where a Partially-Reduced Probe Response may refer to a Probe Response frame that may not contain a full configuration instance. Instead, a Partially-Reduced Probe Response may contain a new configuration instance identifier and a subset of the configuration parameters, for example, those configuration parameters with new values. In other words, it may contain different values from the configuration instance as identified by the configuration instance identifier provided in the Probe Request frame.

This example may require that the AP is able to identify the differences between its current configuration instance and the one identified by the configuration instance identifier provided in the Probe Request frame, which may be achieved by storing several copies of previous configuration instances and the respective changes compared to the current configuration instances, and/or, dividing the configuration instances into subsets of parameters, for example, Subset 1, Subset 2, Subset 3 and Subset 4. The CCC may be divided into four parts as well, with for example, the first 4 bits associated with Subset 1; and/or the last 4 bits associated with Subset 4. By examining the CCC from the STA in the Probe Request, the AP may discover the changed parameter subsets.

A STA may keep track of and use the pre-acquired knowledge about the BSS and/or network in the form of pre-defined system configuration parameter sets to obtain the system information. For example, a STA may keep track of its acquired knowledge about BSS/AP and/or access network system information by using a configuration knowledge database. For each BSS/AP that the STA has acquired knowledge about, there may be an entry in the database, which may contain a BSSID, SSID, location, last-updated-time, configuration parameter sets and/or the corresponding configuration change counts, for example, BSS/AP configuration, access network configuration, and/or combined AP/Network configuration, etc., and values for each configuration parameter that may be present as indicated by its present-indicator. The entries in the configuration database may be organized to facilitate a fast access to the contents, for example, ordered based on the STA usage of the BSS/AP, or ordered based on locations of the BSS/APs, or ordered based on the physical movement routine of the STA, etc. An entry in the configuration database may be initialized when the STA acquires knowledge about a new BSS/AP, and the entry may be maintained every time the STA may receive an update about the BSS/AP, for example, a configuration instance with a new CCC value. A STA may acquire the knowledge of the BSS/AP configuration and/or access network configuration through a wireless link with the BSS/AP, or a wireless link with another BSS/AP, or a wireless link in a cellular network, or a wired link, etc.

Figure 17:
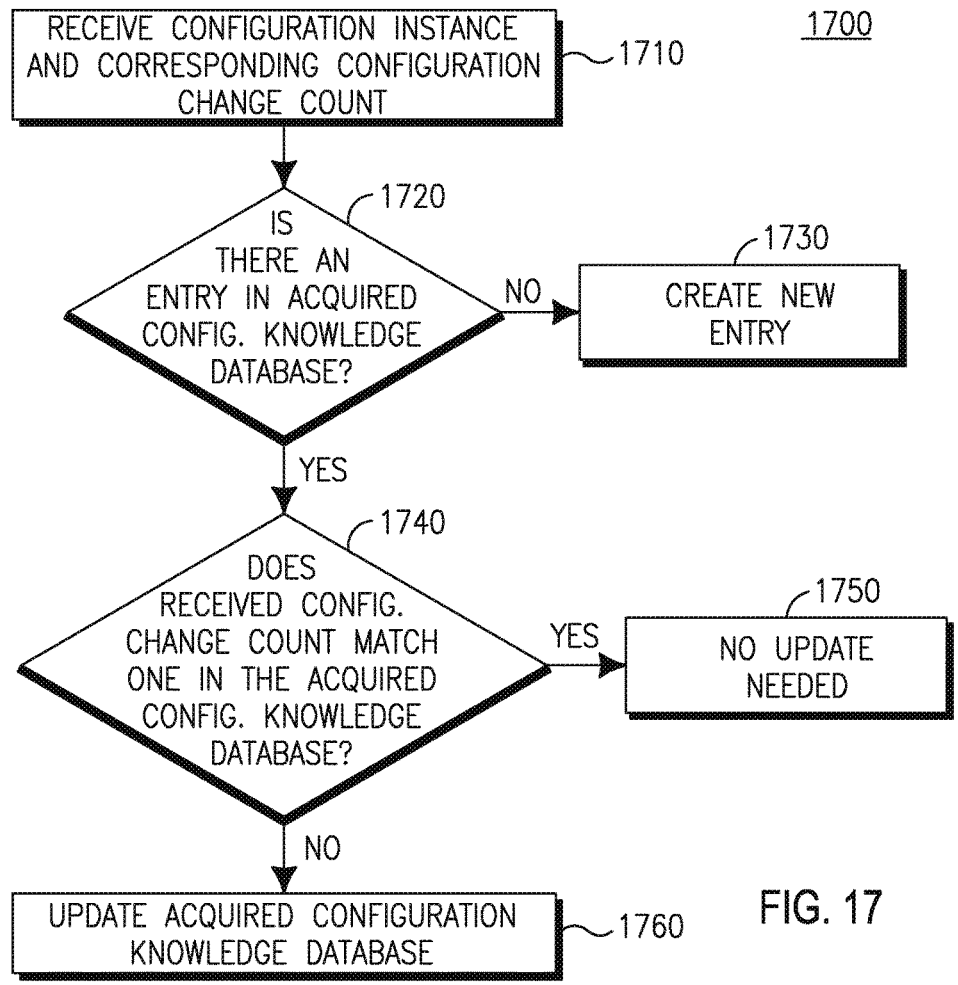
FIG. 17 is a diagram of another example method for supporting the use of pre-defined system parameter sets.

FIG. 17 is a diagram of another example method 1700 for supporting the use of pre-defined system parameter sets. For example, when a STA receives 1710 a full configuration instance and its corresponding CCC, for example, in Beacon frames, Probe Response frames, and/or GAS/ANQP frames, it may check 1720 if there is an entry in its acquired configuration knowledge database. If there is no entry in its acquired configuration knowledge database, then it may create 1730 an new entry. If there is an entry in its acquired configuration knowledge database, then it may check 1740 if the newly received configuration change count matches one in the configuration database. If there is a match, then no update 1750 is needed in the configuration database. If there is no match, then the STA may update 1760 the database with the newly received configuration instance and its corresponding CCC value.

Figure 18:
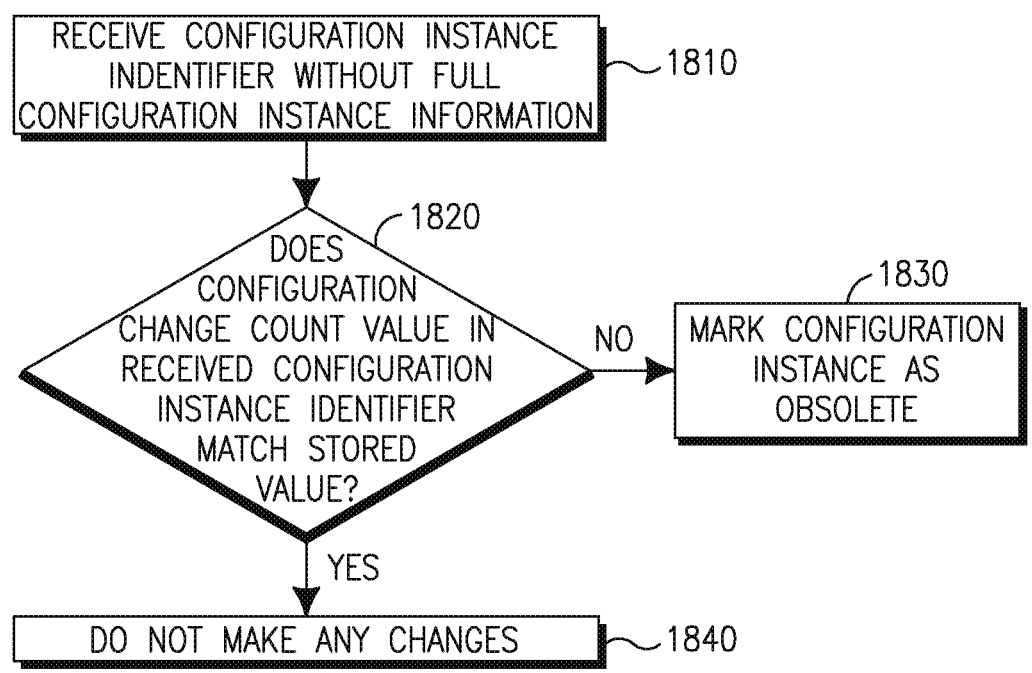
FIG. 18 is a diagram of another example method for supporting the use of pre-defined system parameter sets.

FIG. 18 is a diagram of another example method 1800 for supporting the use of pre-defined system parameter sets. For example, a STA may receive 1810 a configuration instance identifier without full configuration instance information, for example, in FILS Discovery frames, short beacon frames, or in Reduced Probe Response frames. The STA may determine 1820 whether the CCC value in the received configuration instance identifier matches a stored value. If the CCC value in the newly received configuration instance identifier does not match the value stored in the configuration database, then the STA may mark 1830 the corresponding configuration instance as "obsolete" in the database. If the CCC value in the newly received configuration instance identifier matches the value stored in the configuration database, it may not make any changes 1840 to the configuration database.

Figure 19:
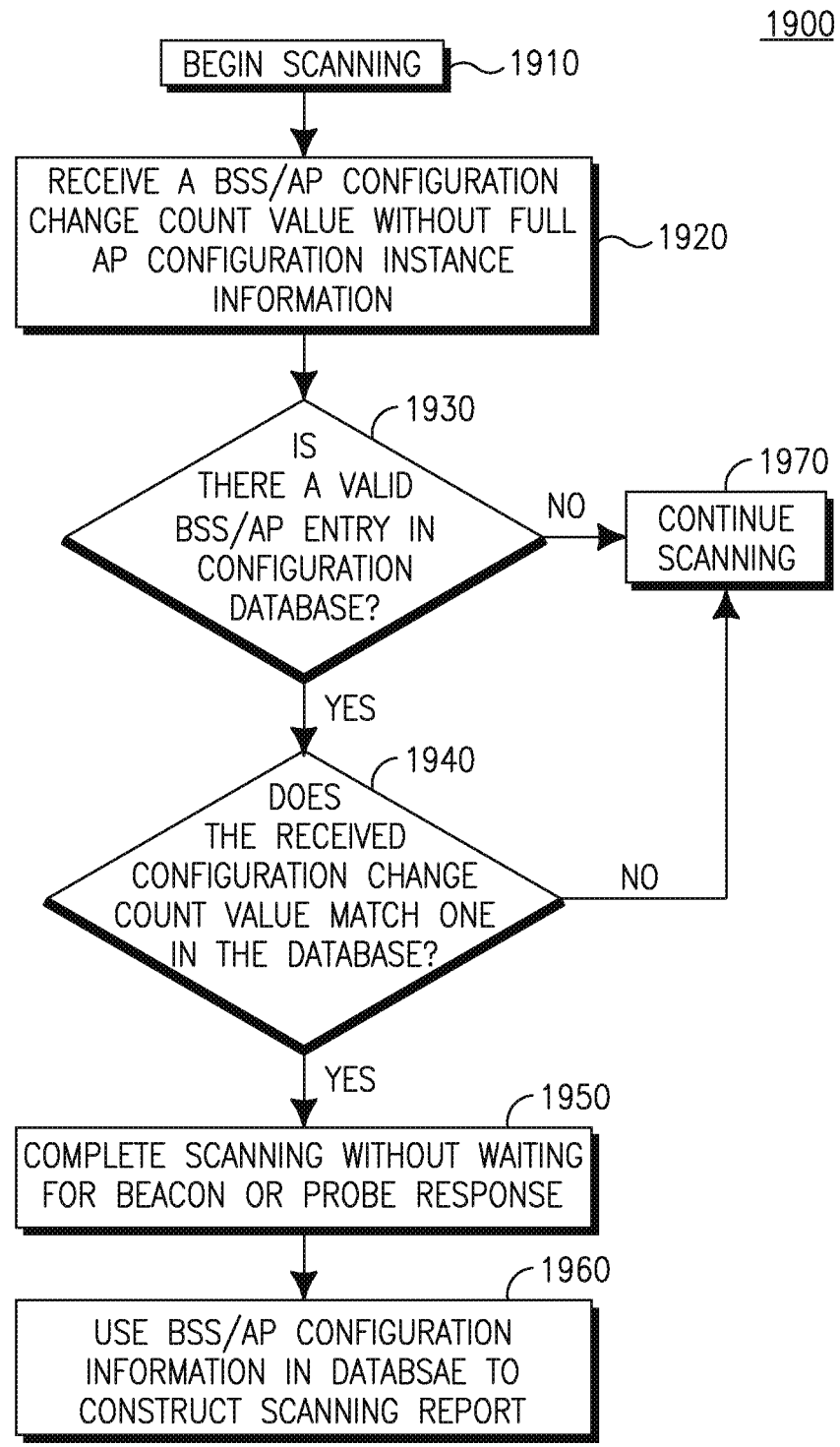
FIG. 19 is a diagram of an example method where a STA may receive configuration instance identifier information without full configuration instance information.

FIG. 19 is a diagram of an example method 1900 where a STA may use the received configuration instance identifier information without full configuration instance information to determine if it has acquired up-to-date system information of the AP and/or network. This example may be use to improve the system information communication efficiency. For example, the STA may begin scanning 1910. The STA may perform either active or passive scanning. The STA may receive 1920 a BSS/AP Configuration Change Count value without full AP configuration instance information, for example, in FILS Discovery frames, Short Beacon frames, or Reduced Probe Response frames. The STA may determine 1930 if there is a valid entry of the BSS/AP in the configuration database. If there is a valid entry of the BSS/AP in the configuration database, the STA may determine 1940 whether the received configuration change count value matches one in the database. If the received AP-CCC matches the AP-CCC in the database, then the STA may conclude that it has valid up-to-date BSS/AP system information. The STA may then complete the scanning process 1950 of the BSS/AP without waiting for a Beacon frame or a Probe Response frame. In this case, the BSS/AP configuration information in the database may be used for the MLME of the STA to construct the scanning report 1960 in MLME-SCAN.confirm primitive, and also it may be used for the STA to initiate the next-step action, for example, association, in the initial link setup process. If there is not a valid BSS/AP entry in the configuration database, or the received configuration change count value does not match one in the database, the STA may continue scanning 1970.

Figure 20:
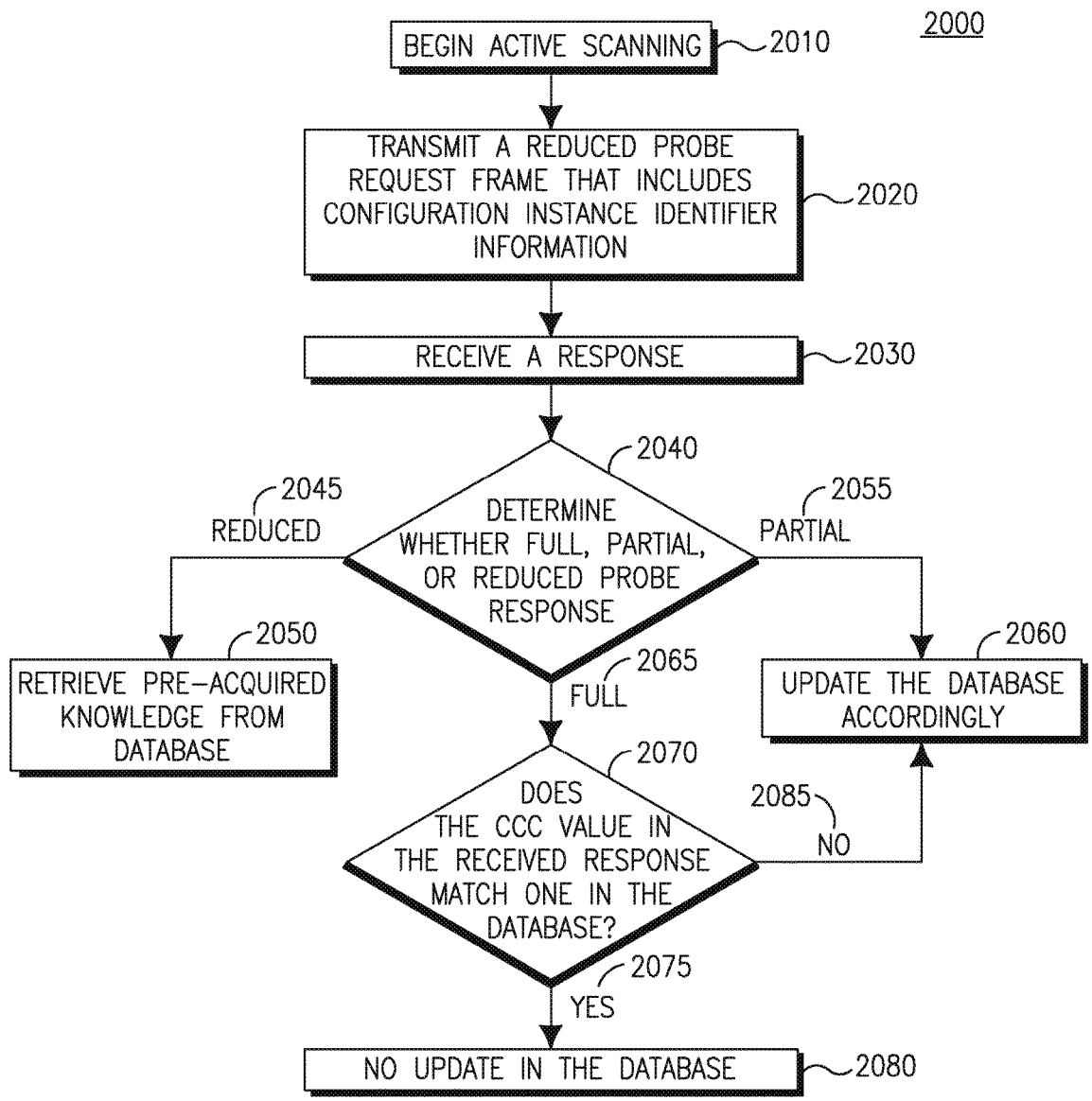
FIG. 20 is a diagram of an example method where a STA may include configuration instance identifier information for pre-acquired system configurations.

FIG. 20 is a diagram of an example method 2000 where a STA may include configuration instance identifier information for pre-acquired system configurations. During active scanning 2010, the STA may transmit 2020 a Probe Request frame that includes configuration instance identifier information for its pre-acquired system configurations, where a configuration instance identifier may be a combination of BSSID, configuration type, and/or CCC. When used in a Probe Request frame, a configuration instance identifier, for example, AP-configuration identifier, represents the parameters in the configuration. Then those configuration parameters are no longer needed to be included individually in each Probe Request frame or Reduced Probe Request frame. In other words, the use of configuration instance identifier information allows the STA to use a Reduced Probe Request frame, so that the airtime occupancy of the Probe Request can be reduced.

When the STA receives 2030 a response, it may determine 2040 whether the received response is a Full, Partial, or Reduced Probe Response frame. When the STA receives a Reduced Probe Response frame 2045 with configuration identifier information but without full configuration instance, it may use its configuration database to retrieve 2050 its pre-acquired knowledge, in a way as described above. When the STA receives a Partial Probe Response frame 2055, the STA may update 2060 the database accordingly. When the STA receives a Full Probe Response frame 2065, the STA may determine 2070 whether the CCC value in the received response matches on in the database. If the CCC value matches 2075, then no update 2080 is required in the database. If the CCC value does not match 2085, the STA may update 2060 the database accordingly.

During network discovery and selection, for example, using a GAS/ANQP, the STA may include access network configuration identifier information in the GAS request frame to indicate its pre-acquired network configuration knowledge. Additionally, when a GAS response is received with configuration instance identifier information but without a full network configuration instance, the STA may use its configuration database to retrieve its pre-acquired network configuration knowledge.

There may also be multiple alternatives regarding how the pre-acquired configuration knowledge database may be managed in the layered protocol architecture of the STA. For example, the pre-acquired configuration knowledge database may be managed by a MAC Layer Management Entity (MLME), a Station Management Entity (SME), or a connection manager module above the MAC/PHY of a WirelessLAN air interface, etc.

If the pre-acquired configuration knowledge database is not managed by the MLME, some information from the database, for example, the configuration instance identifier, may be needed to be included in primitives in the service access points (SAP)s between the MLME and the module managing the database, for example, the SME.

If the pre-acquired configuration knowledge database is not managed by the MLME, for example, if it is managed by SME, two parameters may be included in the primitive MLME-Scan.request, for example ConfigurationType and APConfigurationChangeCount. An example is shown in Table 6 below.

TABLE 6

An Example of New Parameters Added in MLME-Scan.request Primitive

| Name | Type | Valid Range | Description |
|---|---|---|---|
| APConfigurationType | Integer | 0~N-1 | The configuration type of the AP/Network that the STA acquired in the last time |
| APConfigurationChangeCount | Integer | 0~K-1 | The AP Configuration Change Count of the AP/Network that the STA acquired in the last time |

If the pre-acquired configuration knowledge database is not managed by the MLME, for example, if it is managed by SME, a BSSDescriptionUsingConfigurationChangeCountSet parameter may be included in the primitive MLME-Scan.confirm to enable the case where only the configuration type and AP-CCC may be used from the FILS Discovery Beacon, Short Beacon or Reduced Probe Response frames. An example is shown in Table 7 below.

TABLE 7

An Example of New Parameters Added in MLME-Scan.confirm Primitive

| Name | Type | Valid Range | Description |
|---|---|---|---|
| BSSDescription UsingConfiguration ChangeCountSet | Set of BSSDescriptionUsingConfigurationChangeCount | N/A | BSSDescriptionUsingConfigurationChangeCountSet is returned to indicate the results of the scan request expressed in terms of Configuration Type and AP-CCC. It is a set containing zero or more instances of a BSSDescriptionUsingConfigurationChangeCount. Present only for 802.11 systems where AP-CCC is used. |

Each BSSDescriptionUsingConfigurationChangeCount may include one or more of the elements shown in Table 8 below.

TABLE 8

An Example of BSSDescriptionUsingConfigurationChangeCount

| Name | Type | Valid Range | Description |
|---|---|---|---|
| SSID or Compressed SSID | Octet string | 0-32 octets for SSID or 0-4 octets for compressed SSID | The SSID or the hashed SSID of the found BSS |
| Short timestamp | Interger | N/A | The least significant 4 bytes of the Timestamp of the received frame (probe response/beacon) from the found BSS |
| Time to the next full beacon | Integer | N/A | The time between the received short beacon frame to the next full beacon |
| BSSID or MAC Address of the AP | MAC address | 6 bytes | MAC Address of the AP is obtained from the Source address (SA) in the received short beacon frame |
| Configuration Type | Integer | $\text{Log}_2 N$ bits | The configuration type of the found AP |
| AP-CCC | Integer | $\text{Log}_2 K$ bits | The AP Configuration Change Count of the found AP |

In yet another example, fast link setup with location-based pre-acquired knowledge may be used. Location-based pre-acquired knowledge may refer to what a STA has learned regarding the accessible and/or preferred networks for certain geographical locations, such as those frequently visited places, including home, office, meeting rooms, train stations on a daily-routine, local airport, parents' house, or other family members' houses, etc. The location-based accessible/preferred network knowledge may include not only the system information about the network operation mode, but also the security association information of the STA with the network. When entering a frequently visited place, such location-based pre-acquired accessible/preferred network knowledge may be used to accelerate the link setup process. In addition, it may also be used to facilitate fast transitions between accessible networks, for example, offloading from cellular to WLAN, or transitioning from WiFi to cellular.

A STA may keep track of location-based pre-acquired knowledge in a location-based preferred network database, which may also be referred to as a location-based network profile, or simply a location profile. A location in the database may be specified by geographical location descriptors, for example, Latitude, Longitude, Altitude, and optional Azimuth information, and/or civic location descriptions.

For each location in the database, there may be one or multiple accessible and/or preferred networks. For each of the accessible/preferred networks, the database may record the STA pre-acquired knowledge, for example, the network identifier, network type, network configuration parameter sets and values, and the security association information of the STA with the network, etc.

Figure 21:
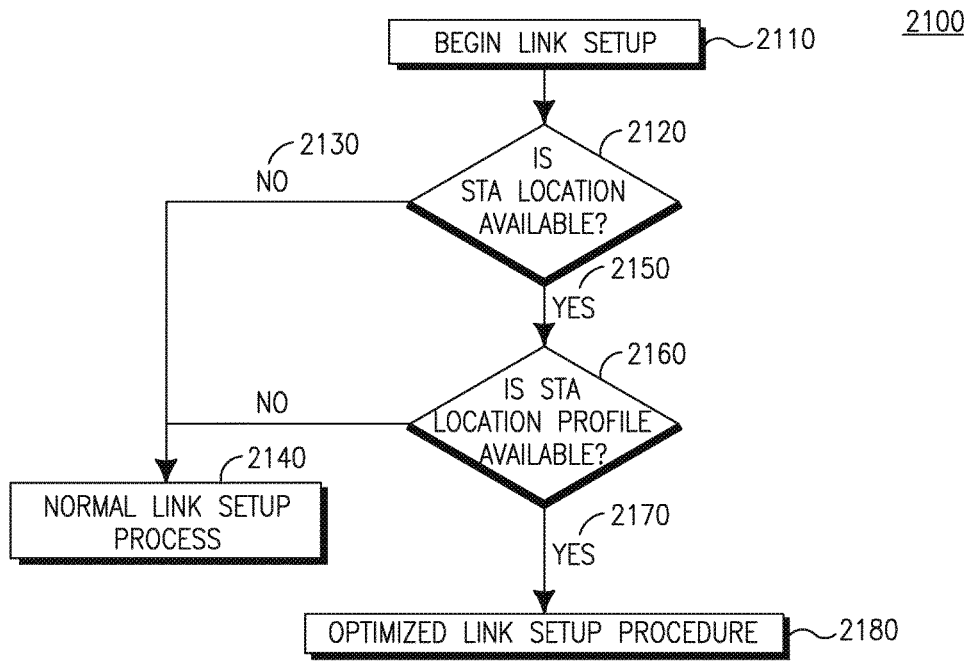
FIG. 21 is a diagram of an example method for performing fast link setup with location-based pre-acquired knowledge.

FIG. 21 is a diagram of an example method 2100 for performing fast link setup with location-based pre-acquired knowledge. In this example, the STA may begin link setup 2110, and determine 2120 whether the STA location is available. If the STA location is not available 2130, the STA may proceed with a normal link setup process 2140. If the STA location is available 2150, the STA may determine 2160 whether a STA location profile is available. If a STA location profile is available 2170, the STA may proceed with an optimized link setup 2180. If a STA location profile is not available 2185, the STA may proceed with a normal link setup 2140.

The contents in the location-based network database may be configured to the STA and/or may be self-learned and maintained by the STA. When the information of a current location of a STA is available, the network management module of the STA, for example, the network connection manager, may use its location-based network database to optimize its network operations, for example, offloading from the cellular network to a WiFi network with fast initial link setup, establishing additional connection with a second network to distribute different types of traffic, and/or reselecting a more suitable network, etc.

The following examples may use the location-based pre-acquired knowledge to accelerate the link setup process in a WiFi network, for example, when the STA knows its current location, for example, through an existing network connection, and/or an embedded location utility.

Figure 22:
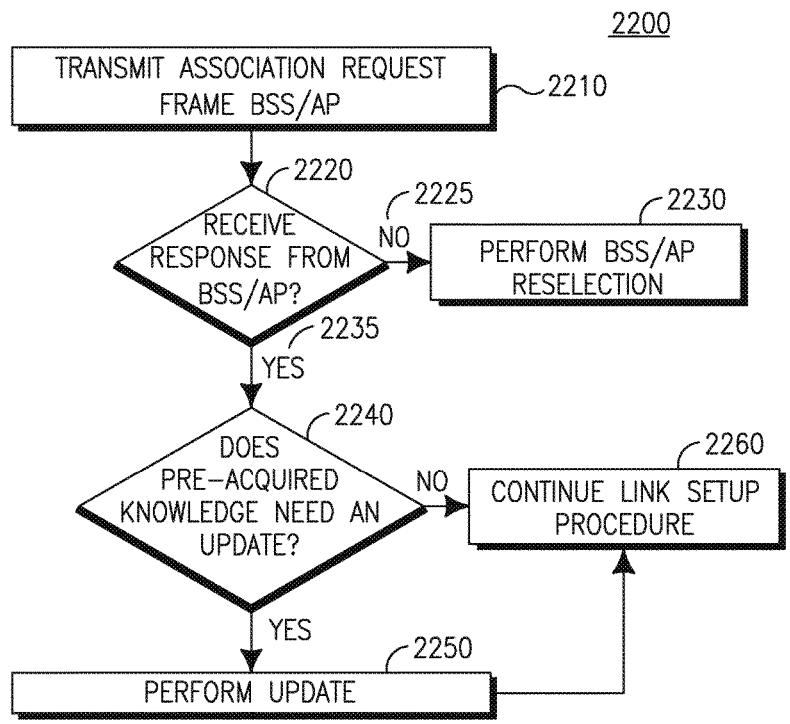
FIG. 22 is a diagram of an example method for link setup optimization.

FIG. 22 is a diagram of a first example method 2200 for link setup optimization where a STA with access to its location-based network database knows exactly the BSS to connect to for a given location. In this example, the STA may skip all steps before the Association step in a typical 802.11 link setup procedure. The STA may transmit 2210 an Association Request frame to the BSS/AP with some additional information items comparable to a regular Association Request Frame, for example, its knowledge about AP/network operational settings, using for example a configuration instance identifier with a combination of BSSID, configuration type, and/or CCC; and/or its knowledge about security association with the AP/Network. The STA may determine 2220 whether a response was received from the BSS/AP.

If the STA does not receive 2225 a response within a pre-defined time interval, the BSS/AP may not be not available, and the STA may perform 2230 a BSS/AP reselection either using the location-based network database or through a normal scanning process. It should be pointed out that this scenario is possible, but it is a more rare case because it may includes the assumption that the STA is aware that the preferred network is accessible, such as the home network, or the office network.

If the STA receives 2235 a response from the AP that confirms that the STA's pre-acquired knowledge is valid with respect to, for example, inclusion of a matching configuration change count, the STA can move forward to the next step in the link setup procedure, without any maintenance actions for its pre-acquired knowledge database. This example may assume that the received response may also include the normal Association response content items.

If the STA receives a response from the AP that indicates that the STA's pre-acquired knowledge needs one or more updates 2240 with respect to, for example, inclusion of a different configuration change count and corresponding configuration instance information in addition to the normal Association response content items. In this example, the STA may perform an update 2250 to its pre-acquired knowledge about the AP/network, and it may perform a corresponding update to its database before moving forward to the next step in the link setup procedure 2260. If the STA receives a response from the AP that indicates that the STA's pre-acquired knowledge does not need an update, the STA may continue the link setup procedure 2260.

The STA may use the pre-acquired security association information with the AP/Network to optimize the security setup process. Note that, with the above optimizations, the link setup procedure may completely skip one time-consuming step, for example, AP/Network discovery, and also significantly reduce the time for another time-consuming step, for example, security setup by using the location-based pre-acquired knowledge. The procedure may only need approximately 5 message rounds between the STA and AP, for example, 1 for Association, 2 for security, and 2 for IP address assignment, plus 2 message rounds between the AP and DHCP server, to complete the IP connectivity establishment between the STA and AP/Network. Accordingly, the link setup time may be reduced to about 20 ms, if the procedure uses the same time values of the link setup steps given above.

In a second example with the access to its location-based network database, the STA may have the knowledge about the preferred BSS/AP(s) at a given location, but may need further confirmation before establishing the connection. In this example, the STA may verify that it has valid information about the AP/network first, and then it may use the steps given in the previous example to complete the link setup process. The following optimizations may be considered to accelerate the AP/Network information verification.

The STA may use the Reduced Probe Request/Response frames and/or Reduced GAS Request/Response frames, where "Reduced" may refer to the configuration identifier information, for example, a combination of BSSID, configuration-type, and/or CCC, to represent a set of parameters in those frames, instead of including the parameters of each individually. When the STA receives a response frame with configuration identifier information that matches information in the database, the STA may verify its data about the AP/Network and may move forward to the next step in the link setup process.

Additionally, if the STA receives a response frame with a full configuration instance and a different CCC value, then the STA may have actually acquired a new update of the corresponding system information, therefore it may also move forward to the next step. Furthermore, there may be multiple ways to transmit a Reduced Probe Request/Response frames, for example: the STA may transmit a unicast Reduced Probe Request, where the configuration instance identifier information may be provided by the BSSID in the MAC frame header, and one or multiple combinations of the configuration type and CCC value are provided in the frame body. With the unicast Reduced Probe Request, the STA may verify its pre-acquired knowledge about one BSS/AP and its associated access network with one or multiple pre-defined system configuration parameter sets; the STA may transmit a broadcast Reduced Probe request, where multiple configuration instance identifiers may be included, each with a combination of BSSID, configuration type, and CCC. With the broadcast Reduced Probe Request, the STA may verify its pre-acquired knowledge about one or multiple BSSs/APs and their associated networks in the same coverage area. After receiving a broadcast Reduced Probe Request, an AP and/or STA may respond if the BSSID of the AP is one of the BSSIDs in the configuration instance identifier information provided in the request frame; an AP and/or STA may respond to a received Reduced Probe Request with a Reduced Probe Response frame if it has at least one configuration instance identifier that matches one of the identifiers provided in the request frame; an AP and/or STA may respond to a received Reduced Probe Request with a regular Probe Response frame with a full configuration instance and its identifier if the BSSID and configuration type of its configuration instance match the corresponding values in one of the identifiers provided in the request frame but the configuration change count does not match.

The STA may use the configuration instance identifier information, for example, a combination of BSSID, configuration-type, and/or CCC value provided in a more frequently transmitted smaller system information announcement frame (compared to regular Beacon frame), for example, a short beacon frame, a fast beacon frame, or a FILS Discovery frame, etc. If the configuration instance identifier matches the corresponding configuration instance identifier in the database, then the verification is complete and the STA may move forward to the next step in the link setup process.

Note that the link setup time in this case may be the sum of the time used to verify AP/Network information and the time of the previous example. If using active scanning, for example, using the Reduced Probe Request/Response frames, the link setup time may be approximately 25 ms. If using more frequently transmitted smaller system information announcement frames (compared to regular Beacon frame), for example, a short beacon frame, or a fast beacon frame, or a FILS Discovery frame, etc., the link setup time may be approximately 20 ms plus the interval of such frames.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for performing active scanning by a non-access point (non-AP) station (STA), the method comprising:
    transmitting, to a group of access points (APs), one or more probe request frames;
    receiving, from a first access point (AP) of the group of APs, in response to the transmitted one or more probe request frames, a first system configuration message comprising a first configuration change count (CCC) value, wherein the first CCC value is an first integer value that represents a first configuration instance;
    receiving, from a second AP of the group of APs, in response to the one or more probe request frames, a second system configuration message comprising a second CCC value, wherein the second CCC value is an second integer value that represents a second configuration instance;
    storing the first CCC value and the second CCC value in a memory of the non-AP STA;
    determining, by the non-AP STA, based on information stored in the memory of the non-AP STA, which one of the first AP or the second AP is a preferred AP; and
    performing an association procedure with the preferred AP.

2. The method of claim 1, wherein the one or more probe request frames includes a service set identification (SSID) of the first AP and an SSID of the second AP.

3. The method of claim 1, wherein the one or more probe request frames includes a broadcast frame.

4. The method of claim 1, wherein the association procedure performed with the preferred AP is a FILS association procedure.

5. The method of claim 1, wherein the first CCC value and second CCC value are integer values which change each time a configuration instance changes.

6. The method of claim 1, wherein the first CCC value and second CCC value are values incremented by one and the first CCC value and second CCC value wrap around to zero once a maximum value is reached.

7. A non-access point (non-AP) station (STA) configured to perform active scanning, the non-AP STA comprising:
    a transmitter configured to transmit to a group of access points (APs), one or more probe request frames;
    a receiver configured to receive, from a first access point (AP) of the group of APs, in response to the transmitted one or more probe request frames, a first system configuration message comprising a first configuration change count (CCC) value, wherein the first CCC value is an first integer value that represents a first configuration instance;
    the receiver further configured to receive, from a second AP of the group of APs, in response to the one or more probe request frames, a second system configuration message comprising a second CCC value, wherein the second CCC value is an second integer value that represents a second configuration instance;
    circuitry configured to store the first CCC value and the second CCC value in a memory of the non-AP STA;
    the circuitry configured to determine, by the non-AP STA, based on information stored in the memory of the non-AP STA, which one of the first AP or the second AP is a preferred AP; and
    the circuitry configured to perform an association procedure with the preferred AP.

8. The non-AP STA of claim 7, wherein the one or more probe request frames includes a service set identification (SSID) of the first AP and an SSID of the second AP.

9. The non-AP STA of claim 7, wherein the one or more probe request frames includes a broadcast frame.

10. The non-AP STA of claim 7, wherein the association procedure performed with the preferred AP is a FILS association procedure.

11. The non-AP STA of claim 7, wherein the first CCC value and second CCC value are integer values which change each time a configuration instance changes.

12. The non-AP STA of claim 7, wherein the first CCC value and second CCC value are values incremented by one and the first CCC value and second CCC value wrap around to zero once a maximum value is reached.

13. A method for performing passive scanning by a non-access point (non-AP) station (STA), the method comprising:
    receiving, from a first access point (AP), a first beacon frame comprising a first configuration change count (CCC) value, wherein the first CCC value is an first integer value that represents a first configuration instance;
    receiving, from a second AP, a second beacon frame, a second system configuration message comprising a second CCC value, wherein the second CCC value is an second integer value that represents a second configuration instance;
    storing the first CCC value and the second CCC value in a memory of the non-AP STA;
    determining, by the non-AP STA, based on information stored in the memory of the non-AP STA, which one of the first AP or the second AP is a preferred AP; and
    performing an association procedure with the preferred AP.

14. The method of claim 13, wherein the association procedure performed with the preferred AP is a FILS association procedure.

15. The method of claim 13, wherein the first CCC value and second CCC value are integer values which change each time a configuration instance changes.

16. The method of claim 13, wherein the first CCC value and second CCC value are values incremented by one and the first CCC value and second CCC value wrap around to zero once a maximum value is reached.

17. A non-access point (non-AP) station (STA) configured to perform passive scanning, the non-AP STA comprising:
    a receiver configured to receive, from a first access point (AP), a first beacon frame comprising a first configuration change count (CCC) value, wherein the first CCC value is an first integer value that represents a first configuration instance;
    the receiver further configured to receive, from a second AP, a second beacon frame, a second system configuration message comprising a second CCC value, wherein the second CCC value is an second integer value that represents a second configuration instance;

circuitry configured to store the first CCC value and the second CCC value in a memory of the non-AP STA;

the circuitry configured to determine, by the non-AP STA, based on information stored in the memory of the non-AP STA, which one of the first AP or the second AP is a preferred AP; and the circuitry configured to perform an association procedure with the preferred AP.

18. The non-AP STA of claim 17, wherein the association procedure performed with the preferred AP is a FILS association procedure.

19. The non-AP STA of claim 17, wherein the first CCC value and second CCC value are integer values which change each time a configuration instance changes.

20. The non-AP STA of claim 17, wherein the first CCC value and second CCC value are values incremented by one and the first CCC value and second CCC value wrap around to zero once a maximum value is reached.

* * * * *

UNITED STATES PATENT AND TRADEMARK OFFICE
CERTIFICATE OF CORRECTION

PATENT NO. : 9,942,927 B2
APPLICATION NO. : 15/651744
DATED : April 10, 2018
INVENTOR(S) : Lei Wang et al.

Page 1 of 1

It is certified that error appears in the above-identified patent and that said Letters Patent is hereby corrected as shown below:

In the Claims

In Claim 1, at Column 49, Line 24, after "CCC value is", delete "an" and insert --a--.
In Claim 1, at Column 49, Line 29, after "CCC value is", delete "an" and insert --a--.
In Claim 7, at Column 49, Line 63, after "is", delete "an" and insert --a--.
In Claim 7, at Column 50, Line 2, after "CCC value is", delete "an" and insert --a--.
In Claim 13, at Column 50, Line 33, after "CCC value is", delete "an" and insert --a--.
In Claim 13, at Column 50, Line 38, after "CCC value is", delete "an" and insert --a--.
In Claim 17, at Column 50, Line 63, after "CCC value is", delete "an" and insert --a--.
In Claim 17, at Column 51, Line 1, after "CCC value is", delete "an" and insert --a--.

Signed and Sealed this
Twenty-first Day of August, 2018

Andrei Iancu
*Director of the United States Patent and Trademark Office*